US008892136B2

(12) United States Patent
Bobotek

(10) Patent No.: US 8,892,136 B2
(45) Date of Patent: Nov. 18, 2014

(54) IDENTIFYING ABUSIVE MOBILE MESSAGES AND ASSOCIATED MOBILE MESSAGE SENDERS

(75) Inventor: Alexander Bobotek, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 143 days.

(21) Appl. No.: 12/844,395

(22) Filed: Jul. 27, 2010

(65) Prior Publication Data

US 2012/0028606 A1    Feb. 2, 2012

(51) Int. Cl.
| | | |
|---|---|---|
| *H04M 3/22* | (2006.01) | |
| *H04W 4/12* | (2009.01) | |
| *H04L 12/58* | (2006.01) | |
| *H04W 12/12* | (2009.01) | |

(52) U.S. Cl.
CPC .............. *H04W 12/12* (2013.01); *H04L 51/12* (2013.01); *H04L 51/38* (2013.01); *H04L 51/28* (2013.01); *H04W 4/12* (2013.01)
USPC ............................ 455/466; 455/418; 709/206

(58) Field of Classification Search
USPC ...................... 455/418, 414.1, 415, 417, 466; 709/224, 206, 207
See application file for complete search history.

(56) References Cited

U.S. PATENT DOCUMENTS

| | | | | |
|---|---|---|---|---|
| 8,311,521 | B1* | 11/2012 | Paczkowski et al. | 455/414.1 |
| 2003/0083078 | A1* | 5/2003 | Allison et al. | 455/466 |
| 2004/0176072 | A1 | 9/2004 | Gellens | |
| 2005/0020289 | A1* | 1/2005 | Kim et al. | 455/466 |
| 2005/0198159 | A1* | 9/2005 | Kirsch | 709/206 |
| 2006/0031328 | A1* | 2/2006 | Malik | 709/206 |
| 2006/0036693 | A1 | 2/2006 | Hulten et al. | |
| 2008/0004048 | A1* | 1/2008 | Cai et al. | 455/466 |
| 2008/0034045 | A1* | 2/2008 | Bardsley | 709/206 |

FOREIGN PATENT DOCUMENTS

JP    57013533 A    1/1982

OTHER PUBLICATIONS

Free Telus SMS SPAM credits http://www.squidoo.com/telusspam. Last accessed Oct. 28, 2010, 6 pages.
BlackBerry App World—SMS Filter http://appworld.blackberry.com/webstore/content/7409. Last accessed Oct. 28, 2010, 1 page.

(Continued)

*Primary Examiner* — San Htun
*Assistant Examiner* — Erica Navar
(74) *Attorney, Agent, or Firm* — Amin, Turocy & Watson, LLP

(57) ABSTRACT

Systems, methods, and devices that identify abusive mobile messages and associated abusive mobile communication device users are presented. A core network can comprise a message abuse detector component (MADC) that can selectively or randomly monitor or sample mobile messages communicated in the core network. The MADC can evaluate origination and destination address information and can identify abusive mobile messages and associated abusive mobile message senders based at least in part on the respective address information and predefined message abuse criteria. The MADC also can distinguish between spam mobile messages, subscription mobile messages, harassing mobile messages, and other mobile messages, and can identify and implement a desired response (e.g., automated response) to the abusive mobile message. To facilitate identifying abusive mobile messages, the MADC also can analyze history and reputation associated with the origination address, reputation of the address reporting an abusive message, message content, etc.

20 Claims, 16 Drawing Sheets

(56) References Cited

OTHER PUBLICATIONS

Sayer. GSMA launches SMS spam reporting service. Posted Mar. 25, 2010. http://www.reuters.com/article/idUS42855295898920100326. Last accessed Oct. 28, 2010, 2 pages.

Ez Texting Anti-Spam Policy http://www.eztexting.com/spam-policy.html. Last accessed Oct. 28, 2010, 2 pages.

Baldwin. Customers can choose to block SMS spam. Published Jul. 7, 2010. http://gulfnews.com/business/features/customers-can-choose-to-block-sms-spam-1.651108. Last accessed Oct. 28, 2010, 2 pages.

Cormack, et al. Feature Engineering for Mobile (SMS) Spam Filtering. SIGIR'07, Jul. 23-27, 2007, Amsterdam, The Netherlands. ACM 978-1-59593-597-7/07/0007. Last accessed Oct. 28, 2010, 2 pages.

Sayer. GSMA launches SMS spam reporting service. Posted Mar. 25, 2010, NetworkWorld. http://www.networkworld.com/news/2010/032510-gsma-launches-sms-spam-reporting.html?page=1.

Office Action dated Sep. 25, 2013 for U.S. Appl. No. 12/880,945, 25 pages.

Office Action dated Mar. 22, 2013 for U.S. Appl. No. 12/880,945, 30 pages.

Office Action dated Feb. 20, 2014 for U.S. Appl. No. 12/880,945, 19 pages.

* cited by examiner

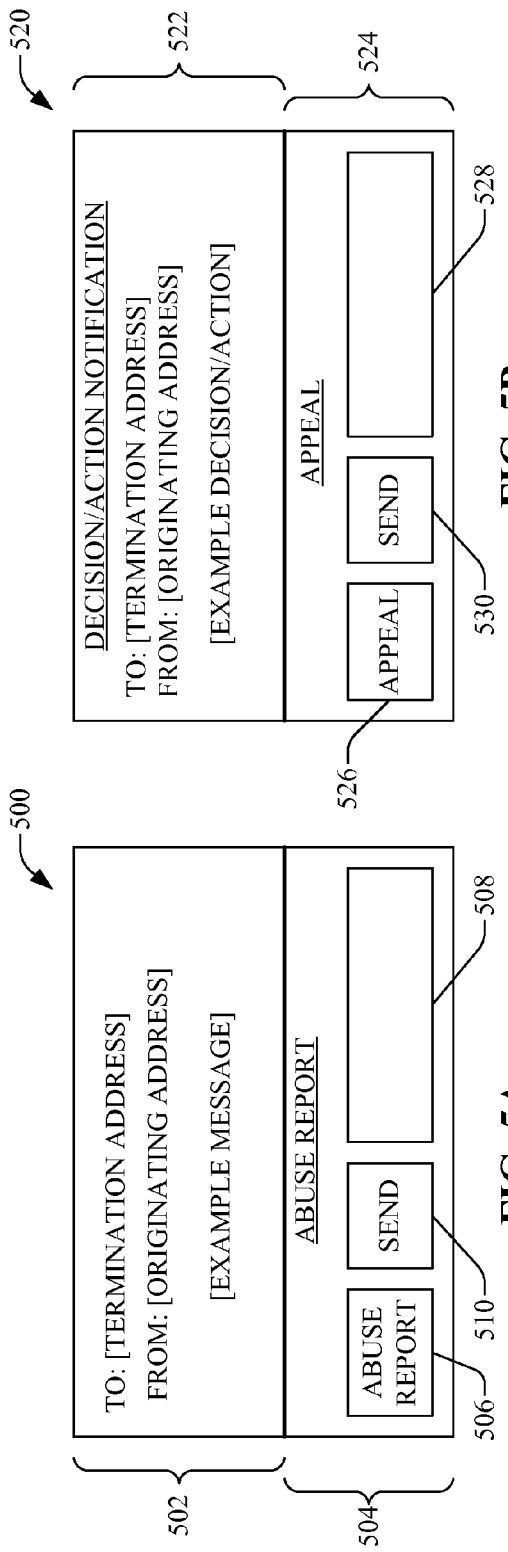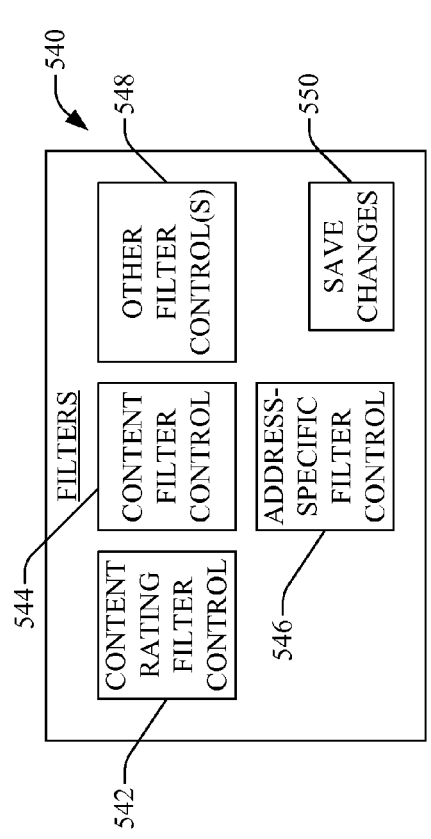

IDENTIFYING ABUSIVE MOBILE MESSAGES AND ASSOCIATED MOBILE MESSAGE SENDERS

TECHNICAL FIELD

The subject innovation generally relates to wireless communications, and, more particularly, to systems, methods, and devices for identifying or classifying abusive mobile messages and associated mobile message senders.

BACKGROUND

Mobile communication devices, such as cellular phones, have become prevalent in everyday life. The use of such devices for messaging (e.g., text messages (e.g., short message service (SMS), enhanced message service (EMS)), multimedia messages (e.g., multimedia messaging service (MMS)), instant messages, Session Initiation Protocol (SIP) messages, etc.) is ever increasing. Some users have unlimited messaging plans, whereby such users are allowed to send or receive an unlimited number of messages over a billing period for a specified fee. However, other users have limited messaging plans, whereby such users pay a certain fee for a specified number of messages per billing period and pay an additional fee per message for each message over the specified number of messages. Still other users have no messaging plan, whereby such users pay a specified fee for each message sent or received during the billing period.

A problem that is on the rise in mobile messaging is spamming, wherein a mobile communication device and/or computer send spam messages originating from the address (e.g., Mobile Subscriber Integrated Services Digital Network Number (MSISDN)) associated with the mobile communication device (e.g., computer connected to the mobile communication device to cause the mobile communication device to quickly send spam messages; computer that is sending spam mobile messages via the account and/or address associated with the mobile communication device). While spam messages have been ubiquitous in emailing for quite some time, they are now on the rise in mobile messaging as well. Pre-paid mobile communication devices with unlimited messaging plans have made it easier and more cost effective for spammers to use mobile communication devices to send spam mobile messages to other mobile communication devices.

Obviously, undesired messages, such as spam or harassing messages, can be a problem for both the user and the wireless service provider. For instance, if the user has a limited messaging plan or no messaging plan, the user may incur a cost for a message that was not desired to be received by the user on the user's mobile communication device, in addition to the inconvenience of having to receive and process (e.g., delete) the undesired message. Undesired messages consume service providers' network resources, forcing service providers to provide costly additional network capacity and/or driving networks traffic volumes to a level where legitimate use of services is or may be denied. Further, when a user contacts a wireless service provider to complain about charges for undesired mobile messages, such complaint calls can be very costly to the wireless service provider, and time consuming for both the user and the wireless service provider. If the problem is a persistent one, users also may become disenchanted with the wireless service and decide to end their subscription with the wireless service provider.

The issue of spamming in mobile messaging is not limited to users receiving undesired spam messages. Another problem arises when a mobile communication device of a user is infected with a malicious software program that automatically sends a spam message to many other mobile communication devices, often without the user even realizing it is happening, resulting in a large messaging bill being incurred by the user. The user then has to take the time to contact the wireless service provider to rectify the problem with the billing as well as the problem with the infected device.

Conventionally, while there have been attempts to address spam emails in email systems, the problem has largely been left unaddressed in mobile messaging. Users typically have been left with the option of contacting (e.g., calling) the wireless service provider to report the receiving (or sending, when the user's device has been infected with a malicious spam program) of undesired messages to try to obtain a credit for the undesired message. Furthermore, for a variety of reasons, spam defenses employed in email systems generally will not be optimal or desirable in the mobile messaging environment.

Another issue with reporting of mobile messaging abuses is that a user may not always accurately report whether a particular message is undesired but subscribed (e.g., where the user may not even realize that the user is subscribed to a service associated with the subscription-related mobile message), spam (e.g., a message, such as a mobile message, that can be undesired and/or unsolicited by the receiver of the message), harassing (e.g., from someone who does not like the user), or otherwise abusive. This and other causes can lead to misclassification of messages, and inappropriate abuse management action(s), such as blocking non-abusive "ham" messages, wherein a "ham" message can be a message, such a mobile message, that can be desired, or at least not be undesired, by a message receiver, for example, even though such message may have been sent to many receivers (e.g., a "Happy New Year" message sent to a number of message contacts associated with a message sender).

A wireless service provider (or user) may desire to take different actions (e.g., block messages, close account of device that is spamming, unsubscribe user from a subscription service, etc.) depending upon the nature of the undesired message(s), there is a need to be able to effectively categorize whether a message is a spam mobile message, a virus, a subscription-related mobile message, or a harassing mobile message.

It is desirable to be able to effectively categorize spam mobile messages and the mobile communication device that originated the spam mobile messages, in contrast to subscription-related mobile messages or harassing mobile messages. Further, it is desirable to be able to respond with (e.g., automatically execute) a desired action appropriate to the category of message and/or originating communication device. Furthermore, it is desirable to reduce the costs (e.g., financial costs, time costs, etc.) associated with spam mobile messages for both the mobile communication device users and wireless service providers.

SUMMARY

The following presents a simplified summary of the subject specification in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems, methods, and devices that identify abusive mobile messages (e.g., spam mobile messages, such as undesirable bulk commercial messages, phishing messages, messages that include a virus(es) and/or infect a mobile communication device with rogue software, etc.) and associated abusive mobile communication device users are presented. In accordance with various embodiments and aspects, a core network can comprise a message abuse detector component (MADC) that can selectively or randomly monitor or sample (e.g., at a desired sample rate) mobile messages communicated in the core network. The MADC can evaluate origination and destination address information, and/or other information as more fully disclosed herein, in the sampled subset of mobile messages, and can identify or classify abusive mobile messages and associated abusive mobile message senders in the subset, based at least in part on the respective address information and predefined message abuse criteria. In an aspect, the MADC also can distinguish between (e.g., classify) spam mobile messages (and different types of spam mobile messages, including, for example, general commercial spam mobile messages, virus-containing mobile messages, phishing mobile messages, etc.), subscription-related or distribution-list related mobile messages, harassing mobile messages, and other types of mobile messages, and can identify and implement a desired response (e.g., automated response) to an abusive mobile message or other classified type of mobile message, such as more fully disclosed herein.

To facilitate identifying abusive mobile messages, distinguishing between different types of abusive mobile messages, and distinguishing between abusive mobile messages and non-abusive mobile messages (e.g., subscription-related mobile messages, "ham" mobile messages), the MADC also can analyze historical information (e.g., call data records (CDRs), abuse reports, or other negative or positive information, if any, associated with the originating address (e.g., Mobile Subscriber Integrated Services Digital Network Number (MSISDN) of mobile communication device sending the mobile message) associated with the mobile communication device and/or user associated with the originating address) and reputation associated with the originating address of the mobile message and/or associated user, reputation associated with the termination address (e.g., reputation of the termination address, reputation of the associated user) reporting an abusive mobile message, mobile message content (e.g., by employing one or more hash algorithms to hash the mobile message content), whitelists, blacklists, information relating to the originating address obtained from honeypot phones, etc.

For example, the MADC can selectively or randomly monitor and sample a desired portion (e.g., all or a portion that is less than all) of mobile messages in a message stream in the core network, to facilitate identifying whether any of the sampled mobile messages is abusive, e.g., spam mobile messages. For instance, the MADC can sample all or a portion of mobile messages for a given time period (e.g., one minute, one hour, one day, one week, . . . ), can sample a specified number of mobile messages, and/or can selectively sample mobile messages originating from a particular originating address (e.g., in response to a received abuse report(s) associated with the particular originating address and mobile message(s) labeled as abusive in the abuse report(s)). In an aspect, the MADC can count the number of mobile messages sent from respective originating addresses contained in the sampled mobile messages, and can identify an originating address associated with a mobile communication device as a high-count mobile message sender, for example, when the originating address has sent a certain number of mobile messages that meets or exceeds a predefined high-count threshold number of mobile messages applicable for the given period of time (e.g., one minute, one hour, one day, one week, . . . ) covered by the mobile message sampling.

For each high-count mobile message sender, in addition to identifying the number of mobile messages sent from the originating address, the MADC can identify the number of unique termination (e.g., recipient) addresses associated with those mobile messages. The MADC can calculate and evaluate the ratio of the number of unique termination addresses to the number of originated messages, and if the ratio meets or exceeds a predefined threshold ratio level indicative of mobile message abuse (e.g., a relatively high ratio value, such as, for example, 0.9 on a scale ranging from 0.0 to 1.0), in accordance with the predefined message abuse criteria, the MADC can identify the mobile messages as abusive (e.g., spam) (or at least potentially abusive, subject to further evaluation) and the originating address as being associated with a mobile message sender that is an abusive message sender (or at least potentially abusive, subject to further evaluation).

In response to identifying or classifying the mobile messages as abusive and the sender as an abusive mobile message sender, the MADC can implement (e.g., automatically respond with) a desired abuse management action(s), which can include, for example, content blockage (e.g., blocking the mobile messages and/or future mobile messages from the originating address), service shutdown for the originating address (e.g., shutdown mobile messaging for the mobile communication device associated with the originating address), SIM shutdown (e.g., shutdown SIM card of the mobile communication device to shutdown operation of the mobile communication device associated with the originating address), quarantine or sideline the abusive mobile messages, credit a recipient(s) of an abusive mobile message(s), blacklist the originating address and associated mobile communication device, generate and communicate abuse reports relating to the originating address to analysts, other carriers, vendors and/or content providers, etc.

In another aspect, mobile communication device users can be provided with an abusive message reporter component (e.g., abuse report button and/or menu) that can be employed by the user to report an abusive message. For example, the abuse report button and/or menu can be provided to the user via a user interface, wherein the mobile communication device can receive input from the user indicating that a received mobile message is deemed abusive by the user and/or additional information regarding why the user deems the mobile message abusive. The abuse report of the user also can include other information, such as originating address of the mobile message, termination address of the mobile message, time of the mobile message, etc. The abuse report can be communicated by the mobile communication device to the MADC, wherein the MADC can evaluate the received abuse report to determine whether the mobile message is an abusive message, suspected of being an abusive message, or not an abusive message; and if it is an abusive or suspected abusive message, the type of abusive message it is, and can implement (e.g., automatically take) a desired action, as more fully disclosed herein, or take no action, in response to the abuse report based at least in part on such determination regarding the mobile message, in accordance with the predefined message abuse criteria.

In another aspect, a mobile communication device and MADC each can comprise respective filter components that can employ one or more filters, at the UE level or the MADC level, to filter mobile messages and/or to block the receipt of certain undesired mobile messages. For example, a filter component can block mobile messages based at least in part on the originating address, type of content, content rating identifier (e.g., adult content, content suitable for persons 13 and older, content suitable for all ages, etc.), information contained in the mobile message (e.g., block mobile messages relating to mortgage or re-financing), and/or other desired filter parameters. The respective filter components can evaluate a received mobile message, prior to notification of the mobile message being provided to the user, and can apply the filters specified by the user (or default filters) to the mobile message, and can determine whether to block the mobile message or not. If the mobile message is to be blocked, the particular filter component can discard the mobile message and not provide notification of the mobile message to the user; and if it is determined that the mobile message is not to be blocked, the mobile message can be presented to the user in accordance with the presentation criteria specified by the user (e.g., present notification of the received mobile message to the user via the user interface).

In still another aspect, the user can set one or more local filters for the mobile communication device by accessing a local filter menu on the mobile communication device and selecting the desired local filters, or accessing the user account on the web site of the wireless service provider and selecting the desired local filters via a provided interface with a menu of available local filters, wherein the MADC can communicate the desired (e.g., selected) local filters to the mobile communication device, and the mobile communication device can be configured in accordance with the desired local filters. In an embodiment, if a mobile message is locally blocked by a mobile communication device in accordance with the local filters implemented, a signal or message can be automatically or manually sent from the mobile communication device to the MADC in the core network to convey to the MADC specifics relating to the blocked message and indicate that the mobile message was locally blocked, and the user account associated with the mobile communication device can or may be credited (or not billed) by the MADC for costs related to the blocked mobile message.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF DRAWINGS

FIGS. 5A, 5B, and 5C illustrate diagrams of example interface displays in accordance with various embodiments of the disclosed subject matter.

DETAILED DESCRIPTION

Figure 1:
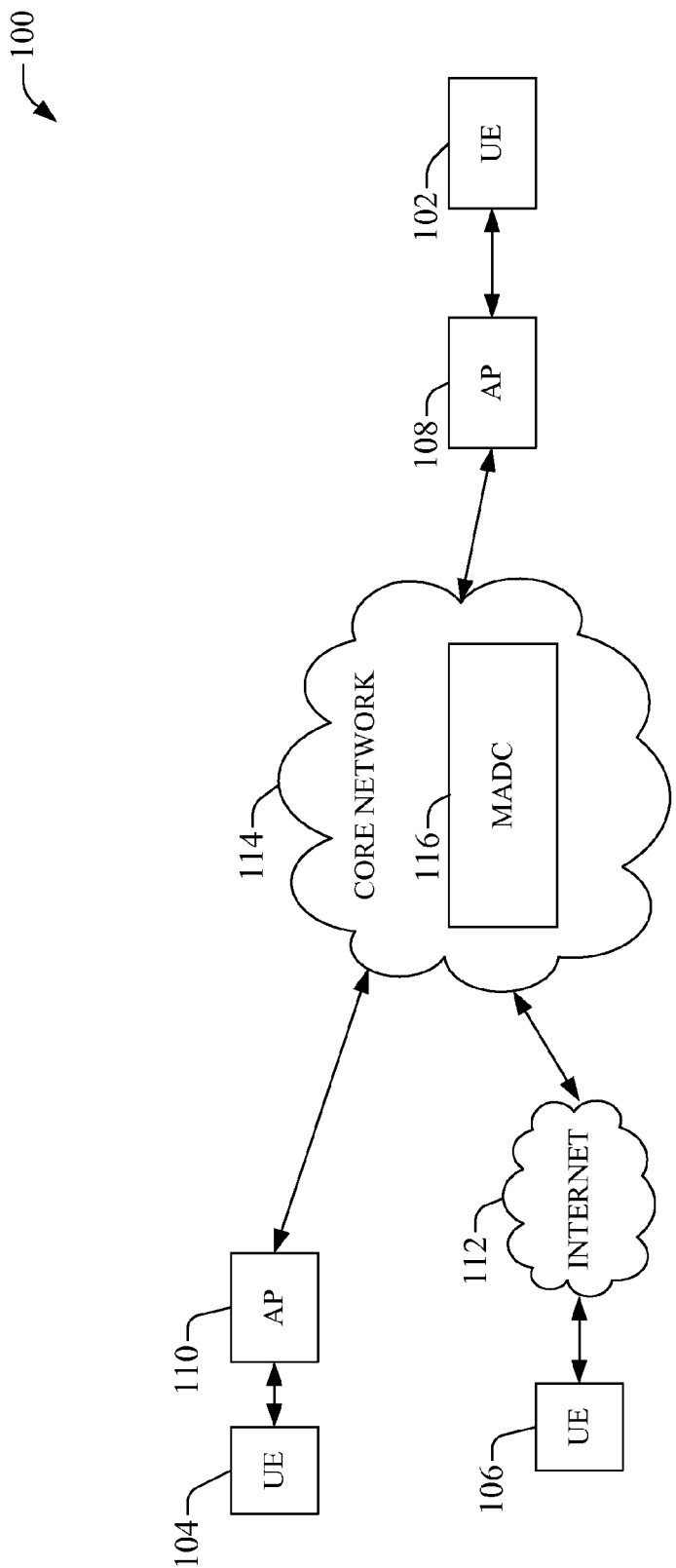
FIG. 1 is a block diagram of an example system that can identify abusive mobile messages and associated abusive mobile communication device users in a communication network environment, in accordance with various aspects and embodiments of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "mobile device", "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream or, in an embodiment, a wired (e.g., landline) communication device that has mobile messaging functionality and is utilized by a subscriber to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.
  2G Second Generation
  3G Third Generation
  3GPP Third Generation Partnership Project
  4G Fourth Generation
  AGPS Assisted GPS
  AP Access Point
  ADSL Asymmetric Digital Subscriber Line
  AWS Advanced Wireless Services
  BRAS Broadband Remote Access Server
  BTA Basic Trading Area
  CDMA Code Division Multiple Access
  CN Core Network
  CS Circuit-Switched
  CSCF Call Session Control Function
  CPE Customer Premise Equipment
  CPN Customer Premise Network
  DHCP Dynamic Host Configuration Protocol
  DSL Digital Subscriber Line
  DSLAM Digital Subscriber Line Access Multiplexer
  E911 Enhanced 911
  FCC Federal Communications Commission
  FL Forward Link
  GGSN Gateway GPRS Service Node
  GPRS General Packet Radio Service
  GPS Global Positioning System
  GW Gateway
  HAP Home Access Point
  HSS Home Subscriber Server
  ISDN Integrated Services Digital Network
  UE User Equipment
  UTRAN Universal Terrestrial Radio Access Network
  IMS IP Multimedia Subsystem
  IP Internet Protocol
  ISP Internet Service Provider
  MSA Metropolitan Statistical Areas
  MSISDN Mobile Subscriber ISDN Number
  MTA Major Trading Areas
  NAT Network Address Translation
  NTP Network Time Protocol
  O&M Operation and Maintenance
  PC Personal Computer
  PCS Personal Communications Service
  PS Packet-Switched
  PSTN Public Switched Telephone Network
  RAN Radio Access Network
  RBS Radio Base Station
  RL Reverse Link
  RNC Radio Network Controller
  RSA Rural Service Area
  SGSN Serving GPRS Support Node
  SIP Session Initiation Protocol
  USSD Unstructured Supplementary Service Data
  VPN Virtual Private Network
  WAP Wireless Application Protocol
  WCDMA Wideband CDMA
  XDSL Asynchronous-DSL or Synchronous-DSL Mobile messaging is a popular way to communicate with other mobile communication device users. However, spam mobile messages are becoming an increasing problem. While spam defenses have been employed to attempt to combat spam e-mails, for a variety of reasons, such conventional spam defenses do not translate well to mobile message spamming and generally will not be effective or desirable in the mobile messaging environment. Additionally, some spam defenses that may be effective in a mobile environment may be ineffective or less effective in an email environment. Abusive mobile messages typically have been dealt with via live calls with representatives of wireless service providers, which can be undesirably costly (e.g., economically) to the wireless service providers, and a frustrating and time-consuming experience for the subscriber. It is desirable to be able to effectively identify spam mobile messages and the mobile communication device that sent the spam mobile messages, in contrast to subscription-related mobile messages or harassing mobile messages. Further, it is desirable to be able to take (e.g., automatically execute) a desired action in response to identified spam mobile messages and mobile message senders. Furthermore, it is desirable to reduce the costs (e.g., financial costs, time costs, etc.) associated with spam mobile messages for both the mobile communication device users and communication service providers (e.g., communication service providers that provide wired, wireless, or converged wired/wireless communication services).

To that end, systems, methods, and devices that identify abusive mobile messages (e.g., spam mobile messages, such as undesirable bulk commercial messages, phishing messages, messages that include a virus(es) and/or infect a mobile communication device with rogue software, etc.) and associated abusive mobile communication device users are presented. In accordance with various embodiments and aspects, a core network can comprise a message abuse detector component (MADC) that can selectively or randomly monitor or sample (e.g., at a desired scalable sample rate) a desired portion of mobile messages communicated in the core network. The MADC can evaluate origination and destination address information (e.g., to identify high-count mobile message senders; calculate an unique ID to overall-mobile-message ratio for high-count mobile message senders), and/or other information as more fully disclosed herein, in the sampled subset of mobile messages, and can identify or classify abusive mobile messages and associated abusive mobile message senders in the subset, based at least in part on the respective address information and predefined message abuse criteria. The MADC can execute (e.g., automatically) a desired action(s) (e.g., abuse management action(s)) in response to identifying or classifying mobile messages sent from an originating address as abusive mobile messages and identifying or classifying an originating address (and associated mobile communication device) as an abusive mobile message sender. In other aspects, a mobile communication device can initiate, generate, and send an abuse report relating to mobile messaging or an appeal relating to action(s) taken with regard to mobile messaging. The MADC can be configured to automatically process received abuse reports and/or appeals.

Referring to the drawings, FIG. 1 is a block diagram of an example system 100 that can identify abusive mobile messages (e.g., spam mobile messages, such as undesirable bulk commercial messages, phishing messages, messages that include a virus(es) and/or infect a mobile communication device with rogue software, etc.) and associated abusive mobile communication device users in a communication network environment, in accordance with various aspects and embodiments of the disclosed subject matter. Aspects and embodiments of the subject specification can be employed in wireless, wired and converged (e.g., wireless and wired) communication networks.

In an aspect, the system 100 can include a desired number of UEs (e.g., mobile and/or wireless communication device, such as a mobile phone (e.g., 3GPP UMTS phone), personal digital assistant (PDA), computer, IP television (IPTV), landline phone comprising mobile messaging functionality, gaming console, STB, multi-media recorder/player, video recorder/player, audio recorder/player, printer, etc.), such as UE 102, UE 104, and/or UE 106 in the communication network environment. UE 102, UE 104, and/or UE 106 can be located in a wireless portion (e.g., region) of the communication network, for example. In an aspect, UE 106 also or alternatively can have a wireline connection. UE 102 can be connected (e.g., wirelessly connected) to an AP 108 (e.g., macro AP, femto AP, pico AP, etc.) that can serve a specified coverage area to facilitate communication by the UE 102 and other UEs (e.g., UE 104, UE 106) in the wireless communication network environment. UE 104 can be connected (e.g., wirelessly connected) to an AP 110 (e.g., macro AP, femto AP, pico AP, etc.) that can serve a specified coverage area (e.g., a different coverage area than AP 108) to facilitate communication by the UE 104 and other UEs (e.g., UE 102, UE 106) in the wireless communication network environment. The APs 108 and 110 can serve respective coverage cells (e.g., macrocells, femtocells, picocells, etc.) that can cover respective specified areas, and the APs 108 and 110 can service mobile wireless devices, such as UE 102 and UE 104, located in the respective areas covered by the respective cells, where such coverage can be achieved via a wireless link (e.g., uplink (UL), downlink (DL)). When an attachment attempt is successful, the UE 102 can be served by the AP 108, and UE 104 can be served by AP 110, and incoming voice and data traffic can be paged and routed to the UE 102 through the AP 108, and to the UE 104 through the AP 110, respectively, and outgoing voice and data traffic from the UE 102 and/or UE 104 can be paged and routed through the AP 108 or AP 110, respectively to other communication devices (e.g., another UE). In an aspect, UE 102, UE 104, and/or UE 106 can be connected and can communicate wirelessly using virtually any desired wireless technology, including, for example, cellular, Wi-Fi, Wi-Max, wireless local area networks (WLAN), etc.

In an aspect, the UE 106 can be communicating with the Internet 112 (or another communication network (e.g., IP-based network)) via a wired or wireless communication connection, wherein, for example, a wired communication connection can be a DSL-type or broadband connection facilitated via an Ethernet connection, and a wireless communication connection can be facilitated via a connection of the UE 106 to an AP (not shown). The UE 106 can transmit mobile messages via the wireless connection through the Internet 112 to other communication devices or by accessing the user account associated with the UE 106 on the wireless service provider's web site via a wired or wireless communication connection, wherein the web site can allow mobile communication device users to use a UE 106 or other communication device (e.g., personal computer) to send mobile messages from the originating address associated with the UE 106 via the Internet 112 to other communication devices, in the communication network environment.

In another aspect, the AP 108 and AP 110, and the Internet 112 can be associated with (e.g., communicatively connected to) a core network 114 (e.g., 2G, 3G, 4G, or xG network, where x can be virtually any desired integer or real value) that can facilitate wireless communication by the UE 102, UE 104, UE 106, and/or other UEs associated with the core network 114 with other communication devices (e.g., wireless communication devices, wireline communication devices) in the communication network environment. The core network 114 can facilitate routing voice and data communications between a communication device(s) (e.g., UE 102, UE 104, UE 106) and other communication devices (e.g., UE, landline phone, computer, email server, STB, multimedia server, audio server, video server, news server, financial or stock information server, other communication devices, etc.) associated with the core network 114 in the communication network environment. The core network 114 also can allocate resources to the UEs in the network, convert or enforce protocols, establish and enforce Quality of Service (QoS) for the UEs, provide applications or services in the network, translate signals, and/or perform other desired functions to facilitate system interoperability and communication in the wireless communication network. The core network 114 further can include desired components, such as routers, nodes, switches, interfaces, controllers, etc., that can facilitate communication of data between communication devices in the communication network environment.

In an embodiment, the core network 114 also can comprise a message abuse detector component (MADC) 116 that can identify and/or classify abusive mobile messages (e.g., spam mobile messages) and associated abusive mobile communication device users, and/or other types of mobile messages (e.g., subscription-related mobile messages, "ham" mobile messages, etc.) based at least in part on predefined message abuse criteria. It is to be appreciated and understood that the mobile messaging can be between two UEs (e.g., 102 and 104) communicating wirelessly via APs (e.g., 108 and 110) or other wireless connection, between UE that is a wired or landline communication device (e.g., landline phone, computer, server, set-top box, electronic gaming console, etc.) and a UE (e.g., 102) communicating wirelessly, or between two UEs that are each wired or landline communication devices. The predefined message abuse criteria can relate to and/or be specified based at least in part on, for example, the number of mobile messages sent from an originating address associated with a UE over a given period of time, the unique ID to overall-mobile-message ratio for high-count mobile message senders, historical information relating to mobile message sending associated with the originating address, information on CDRs, whitelists of respective subscribers, blacklists (e.g., associated with respective subscribers or a global blacklist), reputation associated with an originating address or termination address associated with a mobile message, whether an originating address is identified as or alleged to be an abusive mobile message sender in an abuse report, whether an originating address is identified as having sent a mobile message to a honeypot phone, mobile message content, type of mobile message content, whether the mobile message is being sent from an originating address associated with a user that is in an introductory subscription period with regard to the wireless service subscription, etc.

It is to be appreciated and understood that the term "predefined", as used herein, can refer to a specified, defined, and/or learned criterion, rule, value, level, etc. For instance, the MADC 116 (or another component, such as an AI component) can learn that a different parameter value can facilitate more accurately classifying a mobile message than a current predefined parameter value and can dynamically implement the different parameter value as a new predefined parameter value.

The MADC 116 can fully, selectively or randomly monitor, or sample (e.g., at a desired scalable sample rate, including full sampling when desired) mobile messages (e.g., text messages (e.g., short message service (SMS), enhanced message service (EMS)), multimedia messages (e.g., multimedia messaging service (MMS)), instant messages, Session Initiation Protocol (SIP) messages, etc.) communicated in the core network 114. For instance, when desired, the MADC 116 can selectively sample messages associated with an originating address of a UE (e.g., 104, 106) in response to an abuse report received by the MADC 116, wherein, for example, a user of another UE (e.g., UE 102) has submitted the abuse report via the user's UE indicating that an abusive mobile message was received by the user's UE from the UE associated with the originating address. The MADC 116 also can randomly sample mobile messages to facilitate performance of abusive message detection in a desirably scaled manner (e.g., based at least in part on available system resources) and unpredictability in mobile message sampling so that it is difficult for malicious users (e.g., spammers) to gain knowledge regarding when mobile message sampling will occur to minimize risk that the malicious users can learn when to send abusive messages in the core network 114 without detection. The random sampling can be performed by the MADC 116 to collect or obtain a desired portion of mobile messages from the mobile message stream over a desired time window (e.g., period of time (e.g., an hour, a day, a week, . . . )), for example, for evaluation by the MADC 116. In an embodiment, as desired, mobile messaging information of mobile messages sent in the core network 114 can be stored in respective tables based at least in part on the respective times the mobile messages were sent, wherein each table covers a respective period of time (e.g., a table for each 10 minute period, a table for each one hour period, . . . ), and the MADC 116 can select (e.g., randomly or selectively) one or more of the respective tables to evaluate the mobile messaging information for the respective time period covered by the respective table(s).

In an aspect, the MADC 116 can evaluate origination and/or destination (e.g., termination) address information (e.g., Mobile Subscriber Integrated Services Digital Network Number (MSISDN), Media Access Control (MAC) address or MAC-based address, International Mobile Subscriber Identifier (IMSI), Internet Protocol (IP) address, or other type of communication device address or communication device identifier), and/or other mobile messaging related information (e.g., historical mobile messaging related information, abuse reports, reputation associated with the originating address, reputation associated with the termination address, CDRs, honeypot reports, hashing information relating to mobile message content, etc.) as more fully disclosed herein, in the sampled subset of mobile messages. Based at least in part on the evaluation, the MADC 116 can identify abusive mobile messages and the originating address associated with the UE sending the abusive mobile messages, based at least in part on the respective address information and the predefined message abuse criteria. In another aspect, based at least in part on the evaluation, the MADC 116 can distinguish between (e.g., classify) spam mobile messages, subscription mobile messages, harassing mobile messages, and other types of mobile messages (e.g., non-abusive mobile messages, such as "ham" messages), and can identify and implement (e.g., execute) a desired response (e.g., automated abuse management action(s)), for example, when abusive mobile messages are detected, such as more fully disclosed herein.

As one example, the MADC 116 can monitor and sample a desired portion of mobile messages in a message stream in the core network 114, to facilitate identifying whether any of the sampled mobile messages is abusive, e.g., spam mobile messages. For instance, the MADC can sample all or a portion of mobile messages for a given time period(s) (e.g., one minute, one hour, one day, one week, . . . ), can sample a specified number of mobile messages, and/or can selectively sample mobile messages originating from a particular originating address associated with a UE (e.g., 104), for example, in response to a received abusive message report(s) associated with the particular originating address and mobile message (s). In an aspect, the MADC 116 can count the number of mobile messages sent from respective originating addresses, which are associated with respective UEs (e.g., UE 104, UE 106), contained in the sampled mobile messages, and can identify an originating address associated with a UE as a high-count mobile message sender, for example, wherein an originating address can be, or can be associated with a UE, identified as a high-count mobile message sender, when a certain number of mobile messages have been sent from the originating address over a given period of time that meets or exceeds a predefined maximum threshold number of mobile messages applicable (e.g., applicable threshold limit in relation to the mobile message sender and the time period, with regard to length of the time period and time of day wherein the time period occurs) for the given period of time (e.g., one minute, one hour, one day, one week, . . . ) covered by the mobile message sampling, in accordance with the predefined message abuse criteria.

In an aspect, as desired, the MADC 116 can vary or modify the predefined maximum threshold number of mobile messages relating to identifying high-count mobile message senders in accordance with the predefined message abuse criteria. In another aspect, the MADC 116 also can employ more than one predefined maximum threshold number of mobile messages relating to identifying high-count mobile message senders, wherein such respective threshold limits can be selectively applied to different mobile message senders (e.g., a lower threshold limit for new subscribers who are in an introductory subscription period, as compared to the threshold limit applied to a subscriber after the introductory period has passed). In still another aspect, as desired, the MADC 116 can apply graduated high-count threshold limits, wherein, for example, if an originating address sends a number of mobile messages over an applicable period of time that meets or exceeds a lower high-count threshold limit, but not a higher high-count threshold limit, a first type of mobile message evaluation can be performed by the MADC 116 (e.g., calculate the unique ID to overall-mobile-message ratio for the high-count mobile message sender), and if the originating address sends a number of mobile messages over an applicable period of time that meets or exceeds the higher high-count threshold limit (e.g., applicable to that originating address and/or applicable in relation to the applicable period of time), a second type of mobile message evaluation can be performed by the MADC 116 (e.g., calculate the unique ID to overall-mobile-message ratio for of the high-count mobile message sender and evaluate additional mobile messaging related information; apply a lower ratio level for identifying whether the originating address is an abusive mobile message sender than the ratio level applied for the first type of evaluation, etc.), wherein the second type of mobile message evaluation can be more in-depth than the first type, for example.

Returning again to the example, as desired, for each high-count mobile message sender, the MADC 116 can retrieve information relating to other mobile messages sent by the high-count mobile message sender (e.g., other mobile messages sent from the originating address of the high-count mobile message sender), for example, over a specified time period (e.g., when doing so is in accordance with the predefined message abuse criteria)—that is, selectively sample other mobile messages associated with the originating address—which can reduce the chance of mistakenly classifying a high-count mobile message sender as an abusive mobile message sender, as there can be instances, for example, when a non-abusive mobile message sender simultaneously sends, via the user's UE, a high number of mobile messages to disparate UEs of disparate desired recipients (e.g., friends of the sender). Alternatively, the MADC 116 can decide to not retrieve the additional information relating to other mobile messages sent by the high-count mobile message sender, and can proceed to evaluate the initial sampling of mobile messages associated with the high-count mobile message sender (e.g., when doing so is in accordance with the predefined or learned message abuse criteria).

For each high-count mobile message sender, in addition to identifying the number of mobile messages sent from the originating address (e.g., from the initial sampling of mobile messages and/or the retrieval of other mobile message information for that sender), the MADC 116 can identify the number of unique termination (e.g., recipient) addresses associated with the mobile messages sent from the originating address. The MADC 116 can evaluate the ratio of the number of unique termination addresses to the number of originated messages (also referred to herein as unique ID to overall-mobile-message ratio), and if the unique ID to overall-mobile-message ratio meets or exceeds a predefined threshold ratio level indicative of mobile message abuse (e.g., a relatively high ratio value, such as, for example, 0.9 (or other desired relatively high ratio value that can be higher or lower than 0.9) on a scale ranging from 0.0 to 1.0), in accordance with the predefined or learned message abuse criteria, the MADC 116 can identify the mobile messages associated with the originating address as abusive (e.g., spam) and the originating address as being associated with a mobile message sender that is an abusive mobile message sender. In response to identifying such mobile messages as abusive and the sender as an abusive mobile message sender, the MADC 116 can implement (e.g., automatically respond with) a desired abuse management action(s), which can include, for example, content blockage (e.g., blocking the mobile messages and/or future mobile messages from the UE associated with the originating address), service shutdown for the UE associated with the originating address (e.g., shutdown mobile messaging and/or all other wireless services for the UE associated with the originating address), SIM shutdown (e.g., shutdown SIM card of the UE to shutdown operation of the UE associated with the originating address), quarantine or sideline the abusive mobile messages (e.g., for further evaluation, collection of evidence of abusive mobile messaging, etc.), credit a recipient(s) of an abusive mobile message(s), blacklist the originating address and associated UE, generate and communicate abuse reports relating to the originating address to analysts, other carriers, vendors and/or content providers, etc.

In accordance with an aspect, as desired, and in accordance with the predefined message abuse criteria, the MADC 116 can apply a graduated set of predefined threshold ratio levels indicative of mobile message abuse, wherein, for example, if there are two different threshold ratio levels being applied, a first type of mobile messaging evaluation can be performed when an originating address is identified as meeting or exceeding a first, lower threshold ratio level, but being below the second, higher threshold ratio level, and a second type of mobile messaging evaluation can be performed when an originating address is identified as meeting or exceeding the second, higher threshold ratio level, wherein the second type of evaluation can be more in-depth than the first type (e.g., the second type can comprise evaluating mobile messaging related information from more resources or over a longer period of time). Also, as desired, different threshold ratio levels can be applied to different subscribers, wherein, for example, a lower threshold ratio level can be applied to new subscribers during an introductory subscription period and a higher threshold ratio level can be applied to regular subscribers after the introductory subscription period has passed. Threshold ratio levels also can be varied or modified based at least in part on time of day, resources available for mobile messaging evaluation, current volume of mobile messaging in the core network 114, the message originator's credit history, the message originator's message history, etc.

In an aspect, the MADC 116 also can identify and/or classify a mobile message as a subscription-related mobile message, which can be a non-abusive mobile message (at least in many instances a subscription-related mobile message can be a non-abusive mobile message). During sampling of mobile messages in the mobile message stream, the MADC 116 can or may identify an originating address associated with a subscription service provider as a high-count mobile message sender. Often, but not always, the unique ID to overall-mobile-message ratio for the high-count mobile message sender will be sufficiently low so as not to identify the originating address of the subscription service provider as an abusive (or potentially abusive) mobile message sender. It is therefore desirable for the MADC 116 to be able to distinguish between abusive mobile messages and subscription-related mobile messages or distribution-list related mobile messages. Also, a user can sometimes be mistakenly subscribed to or listed in, or unaware or have forgotten that the user has a subscription with or is listed in, a particular subscription service provider for a particular subscription service or a distribution list relating to a distributor (e.g., distributor of information via mobile message content), wherein the subscription service provider can sometimes communicate information relating to the subscription service, or the distributor can sometimes communicate information, to the user's UE (e.g., 102) via a mobile message. The user, not realizing the mobile message is related to a subscription service or distribution list with which the user is associated (e.g., subscribed to, listed on), and not being receptive to (e.g., not desiring) the mobile message, may submit an abuse report indicating that the mobile message is an abusive mobile message (e.g., spam) to the MADC 116, when the mobile message is actually a subscription-related mobile message or distribution-listed related mobile message. It can or may be undesirable for the MADC 116 to identify the originating address associated with the mobile message as being associated with an abusive mobile message sender solely based on the user indicating that the mobile message is abusive in the abuse report, as the information provided by the user in the abuse report may not be reliable for a variety of reasons (e.g., user is unaware that the user has a subscription with the mobile message sender, user is acting maliciously against the mobile message sender, user is aware of the subscription but is personally dissatisfied with the subscription service (although the overall reputation of the subscription service provider is relatively good), etc.). Further, there can or may be an undesirable or unwarranted cost if mobile messages from a subscription service provider offering a subscription-based service, or a distributor distributing information via mobile messages, are blocked or other sanctions are imposed against the subscription service provider or distributor, as there can be loss of income to the subscription service provider, distributor, and/or the wireless service provider by suspending or blocking mobile messaging by the subscription service provider or distributor. Thus, it can be desirable for the MADC 116 to perform additional evaluation beyond the unique ID to overall-mobile-message ratio in order to accurately identify and classify whether a particular mobile message(s) is abusive or not abusive (e.g., a subscription-related mobile message, a distribution-list related mobile message), and if it is abusive, what type of abusive mobile message it is.

In an aspect, as desired, the MADC 116 can analyze or evaluate other information in addition to the unique ID to overall-mobile-message ratio to facilitate identifying or classifying a mobile messages from a particular originating address as being related to a subscription service or distribution list, or not so related (or as being abusive). For instance, the MADC 116 can analyze originating address information of a mobile message sender to identify whether the originating address is a short code or long code, wherein a short code (e.g., 5-number originating address, as opposed to a 10-number originating address) can be indicative of the sender being associated with a subscription service or distribution list. The MADC 116 also can analyze or evaluate information relating to the reputation associated with originating address and/or associated user, wherein an originating address or user associated with a reputable subscription service or reputable distributor of information is more likely to have established a reputation and/or to have a better reputation (e.g., less abuse reports) than an abusive mobile message sender. The MADC 116 can evaluate the unique ID to overall-mobile-message ratio with the other analyses (e.g., short code/long code analysis, reputation analysis) and can identify or classify the originating address as being associated with a subscription service or distribution list, for example, if the unique ID to overall-mobile-message ratio is below the predefined threshold level indicative of mobile message abuse, the originating address is a short code, and/or the reputation associated with the originating address is relatively good; or, even if the unique ID to overall-mobile-message ratio is at or above the predefined threshold level indicative of mobile message abuse, the MADC 116 can or may still identify the originating address as being associated with a subscription service or distribution list, if the originating address is a short code and/or the reputation associated with the originating address is sufficiently high (e.g., good, wherein a good reputation can be a reputation that has a reputation value that at least meets a predefined minimum threshold reputation value).

If the MADC 116 identifies or classifies the originating address as being associated with a subscription service or distribution list, the MADC 116 can determine that mobile messages associated with the originating address can continue to be communicated in the core network 114, can revise the abuse report to indicate that the mobile messages are not deemed abusive, and/or can discard the abuse report or change the report to a different kind of report (e.g., undesired mobile message report, false positive abuse report). It is to be appreciated and understood that other types of information (e.g., historical information, honeypot reports, hashing information relating to the mobile message content, whitelist, etc.) also can be evaluated as desired to facilitate identifying whether the mobile messages are abusive or non-abusive, whether the mobile messages are related to a subscription service or distribution list (or not), etc.

In accordance with another aspect, additionally or alternatively, when the MADC 116 identifies the originating address as being associated with a subscription service (or distribution list) and/or the recipient UE (e.g., 102) as being subscribed to the subscription service (or listed in a distribution list), and the recipient UE has submitted an abuse report in relation to the mobile message from the subscription service provider or distributor, the MADC 116 can execute (e.g., automatically execute) a desired action(s), such as an unsubscribing action(s), in response. For example, the unsubscribing action(s) can comprise, for example, recommending to the subscription service provider (or distributor) that the subscription of the UE user (e.g., subscriber to the subscription service) be canceled or discontinued, on behalf of the subscriber; notifying the UE user that the mobile message was subscription related (or distribution-list related) and recommending that the UE user contact the subscription service provider (or distributor) to cancel the subscription to the service (or be removed from the distribution list) if the UE user does not desire further mobile messages or service from the subscription provider (or distributor); and/or acting on behalf of the user, via spoofing the UE user's mobile address, to send a message to the subscription service provider (or distributor) to cancel or discontinue the subscription service (or content distribution) for the UE user.

The MADC 116 also can identify and/or classify a mobile message as being a harassing mobile message, which can be another type of abusive mobile message. For instance, a user may receive, via the user's UE (e.g., 102), an undesired mobile message from a UE (e.g., 104) of a mobile message sender who is known or unknown to the user, wherein the mobile message includes something the user finds offensive. The user can or may generate and send an abuse report regarding the received mobile message to the MADC 116, wherein the abuse report can be received by the MADC 116.

In response to the abuse report, the MADC 116 can evaluate the unique ID to overall-mobile-message ratio for the originating address from which the mobile message was sent (e.g., by sampling and evaluating mobile messages from the originating address over a desired period of time), historical information relating to the originating address, reputation associated with the originating address, content in the mobile message (e.g., the content itself, hash values relating to hashing of the content in the mobile message), whitelist associated with the abuse report sender, and/or honeypot reports, etc., to facilitate identifying or determining whether the mobile message associated with the abuse report is abusive or not, and if so, what type of abusive mobile message (e.g., harassing) it is.

For example, if the unique ID to overall-mobile-message ratio is relatively low (e.g., below the predefined threshold level indicative of mobile message abuse) with regard to the originating address associated with mobile message identified in the abuse report, the number of abuse reports associated with the originating address is relatively low (e.g., below a predefined threshold number of abuse reports), the reputation associated with the originating address is relatively good (e.g., at or above a predefined threshold reputation level indicative of a good reputation), and/or the content in the mobile message appears to be directed specifically to the recipient (e.g., mobile message identifies the recipient by the recipient's name), the MADC 116 can identify the mobile message identified in the abuse report as an abusive harassing mobile message (or non-abusive, for example, if the mobile message content is deemed to not be objectively offensive), as opposed to identifying the mobile message as spam, for example. In such instance where the mobile message is identified as an abusive harassing mobile message, the MADC 116 can or may take no action against the UE or user associated with the originating address, or can automatically take a desired abuse management action(s) in response to the abusive harassing mobile message, in accordance with the predefined message abuse criteria, wherein the desired abuse management action(s) can comprise, for example, indicating in the abuse report that the mobile message is an abusive harassing message, generating and issuing (e.g., sending) a warning message to the UE (e.g., 104) associated with the originating address to warn the abusive mobile message sender to not send abusive mobile messages and/or notifying the abusive mobile message sender that future abusive mobile messaging can result in sanctions against the sender (e.g., blocking of mobile messages sent from the originating address, termination of service for the UE associated with the originating address, legal action etc.), sending a mobile message to the recipient of the abusive harassing mobile message to recommend to the recipient that the recipient install a message block (e.g., a message block filter) against the originating address of the abusive mobile message sender or offer to install the message block which the recipient can opt to accept or not, crediting (or not billing) the account of the recipient for the abusive mobile message, and/or taking another desired responsive action.

In yet another aspect, the MADC 116 can identify and/or classify a mobile message as non-abusive, for example, when a mobile message(s) is "ham" —that is, when a mobile message(s) contains often disseminated, non-offensive, non-spam content, such as "Happy New Year", "Merry Christmas", "Happy Birthday", and the like, which can or may be sent at certain times by a UE (e.g., 102) to a lot of other UEs (e.g., associated with friends of the mobile message sender) and/or by a lot of different UEs to a lot of recipient UEs. For instance, during sampling of mobile messages in the mobile messaging stream in the core network 114 by the MADC 116, the MADC 116 can or may identify one or more high-count mobile message senders and evaluate the unique ID to over-all-mobile-message ratio(s) for such high-count mobile message senders and determine that such ratio(s) is at or above the predefined threshold level indicative of mobile message abuse. As desired, the MADC 116 can perform further evaluation with regard to the mobile messages and associated originating address(es) of the high-count mobile message sender(s) to facilitate identifying or determining whether those mobile messages are abusive, and if so, the type of abusive mobile message they are. For example, the MADC 116 can evaluate hash information relating to the content of the mobile messages or evaluate the mobile message content itself, and comparing the hash information (e.g., hash values) or content to known spam hash values (or content) and/or known "ham" hash values (or content), to facilitate identifying or determining whether those mobile messages are abusive (e.g., determining whether the mobile message content (or associated hash values) match any known spam content (or associated spam hash values) or known "ham" content (or associated "ham" hash values)). If the MADC 116 identifies or classifies the mobile message content as "ham", wherein the MADC 116 can maintain (e.g., store in a data store) a list of known "ham" content and/or hash information representative of "ham" content as well as known spam content and/or spam hash values representative of spam content, the MADC 116 can identify or classify the mobile messages and associated high-count mobile message sender(s) as non-abusive.

However, abusive message senders (e.g., spammers) may try to obfuscate the spam portion (e.g., URL to a web site of a spam-related entity) of a mobile message by including content that may be classified as "ham" (e.g., "Happy Birthday") in the mobile message as well. In such instances, the MADC 116 also can identify the spam portion of the mobile message based at least in part on evaluation of the hashing information or message content itself of the mobile message and/or can perform further evaluation of the mobile messages and associated originating address(es) (e.g., evaluate historical information associated with the originating address, reputation associated with the originating address, honeypot reports, etc.) to facilitate identifying the mobile messages as abusive, even if they also contain "ham" or other non-abusive content as well.

In certain instances, a malicious entity can use a communication device (e.g., UE) to send malware (e.g., spamming malware) to or install control malware in a UE of an innocent and/or unknowing user, wherein the malware is used to configure the UE of the innocent and/or unknowing user to send (e.g., automatically send) abusive mobile messages (e.g., spam) to other UEs, as desired by the malicious entity. This can result in abusive mobile messages being received by other UEs, and can or may result in the innocent and/or unknowing user being charged for the sending of the abusive mobile messages (e.g., if such user has a limited mobile messaging plan or no mobile messaging plan) and/or having mobile messaging services of the innocent and/or unknowing user being suspended or blocked.

In an aspect, the MADC 116 can identify the abusive mobile messages from the infected UE and the originating address of the infected UE, for example, by identifying the UE as a high-count mobile message sender and evaluating the unique ID to overall-mobile-message ratio(s) for such high-count mobile message sender and/or evaluating other mobile message related information (e.g., historical information or reputation associated with the originating address, abuse reports associated with the originating address, honeypot reports, etc.). The MADC 116 also can drill down into (e.g., perform a more detailed evaluation of) the mobile message related information to determine, for example, whether the user associated with the infected UE had/has a sufficiently good reputation (at least prior to the current mobile messaging being evaluated) or not, or whether the user or associated originating address had abuse reports (e.g., at least a predefined threshold number of abuse reports) against them (at least prior to the current mobile messaging being evaluated), where a good reputation and/or a lack of or a low number of abuse reports can indicate that the user associated with the UE is not or at least may not be intentionally sending the abusive mobile messages via the user's UE.

If the MADC 116 determines that the mobile messages are abusive, but that there is information indicating that the user associated with the originating address is not intentionally sending such messages from the user's UE, the MADC 116 can take (e.g., automatically perform or execute) a desired action(s) (e.g., abuse management action(s)) in response. For example, the MADC 116 can suspend, or at least temporarily suspend, mobile messaging by the user's UE; can contact the user to deliver or obtain additional information to be used in determining how to further respond to the abusive mobile messages (e.g., to determine whether the user is an abusive message sender, or whether the user is innocent but has an infected UE) and/or notify the user that the user's UE may be infected with malware; recommend that the user have the UE checked for malware; credit the accounts of recipients of the abusive mobile messages for costs incurred in receiving the mobile messages; credit the account of the user for abusive mobile messages sent by the user's UE due to the malware, if it is determined that the UE was infected with spamming malware; and/or take other desired responsive action.

In an aspect, as disclosed herein, as desired, the MADC 116 can access honeypot reports to facilitate identifying whether a mobile message is abusive or not. Honeypot reports can be generated in relation to honeypot phones, which are a specified number of phones of a service provider that the service provider does not use in regular service, but rather uses to facilitate identifying abusive mobile message senders and/or abusive callers. Since the honeypot phones are not used in regular service, the honeypot phones typically should not be receiving mobile messages. A honeypot report can comprise information, such as, for example, originating address of a particular mobile message, termination address of the particular mobile message, type of content in the particular mobile message, length of the particular mobile message, whether the particular mobile message contains an URL, time the particular mobile message was sent, etc.

If one or more honeypot phones receives a mobile message from a communication device (e.g., UE 104) associated with an originating address, such mobile messaging can be indicative of abusive mobile messaging. It is understood that a user may misdial and address or otherwise accidentally send a mobile message to an address associated with a honeypot phone. To minimize mistakenly identifying an accidental sending of a mobile message to a honeypot phone as an abusive mobile message, the MADC 116 can evaluate the honeypot reports, which can include information regarding mobile messages and/or calls received by honeypot phones over time (e.g., a specified period of time), and can identify, in the honeypot reports, an inordinate number of mobile messages (e.g., a number of mobile messages that meets or exceeds a predefined maximum number of mobile messages for honeypot phones applicable for the specified period of time) received by honeypot phones from a particular originating address, and/or a pattern of mobile messaging from the originating address to honeypot phones, either of which can indicate that the UE associated with the originating address is sending abusive mobile messages.

In still another aspect, as disclosed herein, the MADC 116 can employ (or another desired component associated with the core network 114 can employ) hashing techniques (e.g., using hashing algorithms) to hash content contained in mobile messages, wherein hashing the message content can provide information in a compressed form regarding the content of a mobile message and also can provide a level of privacy with regard to message content, since the hash is an abstract representation of the message content, or portion thereof, and is not showing the content itself. One or more of a variety of hashing techniques can be used by the MADC 116 (or the other desired component) to identify or classify the content of mobile messages to facilitate identifying whether a mobile message is abusive or not.

For example, one hashing technique can scan one or more mobile messages to identify specified keywords (e.g., mortgage, Viagra, refinancing, or other keyword(s) identified as being indicative of spam), which when in a mobile message can be indicative of an abusive mobile message, and the MADC 116 (or the other desired component) can generate and store hash information (e.g., hash values, wherein respective hash values can indicate respective specified keywords or specified keywords in general) that can indicate whether and/or to what extent a mobile message contains one or more of the specified keywords. The MADC 116 (or other desired component) can employ another hashing technique to scan content of a mobile message for URLs, wherein an URL in a mobile message (particularly when one or more of the specified keywords is also in the mobile message) can or may be indicative of an abusive mobile message, and can generate and store hashing information that can indicate whether and/or to what extent a mobile message contains one or more URLs and/or identify the destination (e.g., web site) associated with the URL. The MADC 116 (or other desired component) also can utilize a hashing algorithm that scans the color scheme of the mobile message (e.g., color of text, color of URL, color of heading, etc.), as certain color schemes are typically used by spammers, and can generate and store hashing information representative or indicative of the color scheme of the mobile message. The MADC 116 (or other desired component) can apply yet another hashing technique that can divide a mobile message into a desired number of subsections and can scan each subsection to determine whether there is content there or blank space, and can generate hashing information (e.g., generate a hash value of 1 when there is content in a subsection, generate a hash value of 0 when there is blank space in a subsection) that can be representative of the content in the mobile message. This hashing algorithm can facilitate identifying mobile messages that contain the same or similar content, which if there are a sufficient number of the same or similar mobile messages, can or may be indicative of abusive mobile messaging. It is to be appreciated and understood that the above-referenced hashing techniques are but a few examples of the hashing techniques that can be utilized in accordance with the subject specification, and that the subject specification can encompass and employ all hashing techniques (e.g., and associated hashing algorithms) to generate hashing information representative of the content of mobile messages.

In an aspect, one or more predefined message abuse rules, comprising one or more mobile message classification rules, can be generated (e.g., generated by the MADC 116 or another desired component) or selected by a particular UE user (e.g., respective local or manual filters selected by respective UE users), in accordance with the predefined message abuse criteria, and applied to mobile messages by the MADC 116 to facilitate classifying a mobile message as abusive or not, and/or classifying the specific type of mobile message it is; identifying an automated abuse management action(s), if any, that is to be performed in response to an identification or a determination regarding a mobile message (e.g., identification or classification of a mobile message as abusive); blocking of mobile messages, or other abuse management action, such as more fully disclosed herein. For instance, the global or external message abuse rules (including those rules relating to filtering of mobile messages) desired by the wireless service provider can be applied by the MADC 116 with respect to mobile messaging in the core network 114 in general, and the MADC 116 and/or a particular UE (e.g., 102) can apply other message abuse rules (e.g., filter rules) selected by the particular user of the particular UE.

In still another aspect, the MADC 116 can employ one or more limiters that can limit the number of mobile messages sent from respective UEs in accordance with the predefined message abuse criteria and associated predefined message abuse rules. Limits can or may depend at least in part on the subscriber's history (e.g., length of the UE's subscription, history of sending ham, history of sending spam, etc.). For example, when wireless service is initially activated for a UE (e.g., 104), the MADC 116 can employ a first limiter (e.g., introductory period limiter) that can be used during an introductory or trial period, which can be for a desired length of time, to limit the number of mobile messages sent by the UE over a predefined period of time (e.g., 1 hour, 1 day, . . . ) to a predefined or variable threshold maximum number of mobile messages (e.g., 15 mobile messages per hour; 50 mobile messages per day) applicable for the introductory period (e.g., one or more predefined threshold maximum numbers of mobile messages that can be applied and varied, as desired, based at least in part on the predefined message abuse criteria). This maximum number of mobile messages can or may depend at least in part on the UE's subscription and the subscriber's history. As desired, the MADC 116 can employ a multi-limiter or more than one limiter to enforce respective limits at the same time, wherein, for example, there can be a hourly limit to the number of mobile messages sent by the UE and a daily limit to the number of mobile messages sent by the UE. The MADC 116 also can employ one or more other limiters (e.g., single limiter, multi-limiter) that can be employed on a regular basis, for instance, with regard to UEs that are no longer in the introductory subscription period, to limit the respective number of mobile messages sent by UEs to a desired predefined maximum threshold number of mobile messages that can be sent for the applicable period(s) of time (e.g., 50 mobile messages per hour; 250 mobile messages per day; . . . ). If more than the applicable threshold limit of mobile messages is sent from the UE during the applicable time period, the MADC 116 can block the mobile messages from being sent, or at least the portion of the mobile messages that exceed the applicable limit, can send a notification to the UE to notify the user that the mobile message limit has been reached and/or whether a mobile message was sent or not, and/or can trigger an evaluation of the mobile message sending for the UE and associated originating address to identify whether the mobile message sending from that UE us abusive or not, wherein a desired action(s), if any, can be taken, in accordance with the predefined message abuse criteria. It is to be appreciated and understood that the threshold mobile messaging limits applied by the limiters can be the same or different from the threshold limits relating to identifying high-count mobile message senders, as desired. For example, a mobile message sender can meet or exceed a high-count threshold limit, while still not exceeding a threshold mobile messaging limit applied by a limiter, when the high-count threshold limit is lower than the threshold mobile messaging limit applied by the limiter.

In an embodiment, the MADC 116 also can provide an automated appeal process to enable a user to appeal action(s) associated with mobile messages that were taken in relation to mobile messaging, for example, when the user believes that an incorrect identification regarding mobile messages associated with the user was made and/or an incorrect responsive action was taken against the user's UE and/or user account. When an action(s) (e.g., identification of a mobile message as abusive (or not abusive), suspending or blocking mobile messaging, denial of credit with regard to a mobile message(s), etc.) is taken with regard to mobile messaging associated with a particular user, and the particular user disagrees with the action(s) taken, the user can use the UE (e.g., 102) or other communication device (e.g., personal computer to access the web site of the wireless service provider) to communicate an appeal regarding the action(s) taken.

The MADC 116 can receive the appeal request from the UE or other communication device of the user, and can process (e.g., automatically process) the appeal of the user. For example, the MADC 116 can automatically perform further evaluation (e.g., a more detailed and precise evaluation) of the information relating to the mobile messaging and/or user, which resulted in the action(s) initially taken (e.g., executed), and/or other information (e.g., information not evaluated by the MADC 116 during the initial evaluation, and/or information submitted by the user as part of the appeal request), than the initial evaluation performed by the MADC 116 that resulted in the action(s) taken, which is the subject of the appeal by the UE user. The MADC 116 can generate (e.g., automatically generate) a response to the appeal of the user based at least in part on the further evaluation of information relating to the mobile messaging and/or the other information, wherein the appeal response can be that the action(s) originally taken was correct or appropriate, or can identify a different action(s) that is to be taken (or should have been taken) by the MADC 116 (or other component) in relation to the mobile messaging associated with the user. For example, if the MADC 116 initially took (e.g., executed) an action to block mobile messaging from the UE of the user because the MADC 116 identified certain mobile messages from that UE as being abusive based on the evaluation of the unique ID to overall-mobile-message ratio(s) with regard to those certain mobile messages, and the user appeals, the MADC 116 can perform further evaluation of other information, such as historical information associated with the originating address of the UE or user, reputation of the originating address or user, abuse reports (if any) associated with the originating address or user, whitelist of the appellant, and/or honeypot reports, etc., to facilitate processing the appeal and determining whether the action(s) (e.g., abuse management action(s)) initially taken was the correct action(s), and, if such action(s) was not correct, identifying a correct action(s) to take based at least in part on the further evaluation, in accordance with the predefined message abuse criteria.

In accordance with various embodiments, the MADC 116 can perform the functions, as disclosed herein, across all or a desired portion of a subscriber base associated with the core network 116, including current network portions and legacy network portions of a communication network. In accordance with various other embodiments, as desired, there can be inter-cooperation between wireless service providers to facilitate classifying mobile messages to, for example, identify whether a mobile message and associated sender is abusive or not, and if so, classify the type of abusive message; and identify a desired automated abuse management action(s) to perform in response to the classification or determination made regarding the mobile message. For instance, the MADC 116 associated with one wireless service provider can desirably communicate with one or more MADCs (not shown) respectively associated with other cooperating wireless service providers to uniformly share information (e.g., identified abusive mobile messages and associated originating address information, historical information, reputation information, abuse reports, etc.) and uniformly apply the predefined message abuse rules, or at least a desired portion thereof, to mobile messages communicated in the respective communication networks of the respective wireless service providers. As desired, the wireless service providers can respectively protect privacy rights of users (e.g., as legally necessary) when cooperating to share information with each other.

In an embodiment, the MADC 116 can generate abuse reports or other mobile messaging related reports that can be provided to analysts, other wireless service providers, vendors, and/or content providers (e.g., subscription service providers), wherein such reports can be used to facilitate identifying abusive mobile message senders, reducing abusive mobile messaging, maintaining or improving subscription services, etc.

In another aspect, a UE (e.g., 102, 104, 106) can provide an interface with an abusive message button or menu and/or a region where additional information relating to the abuse report can be received so that UE users can generate and transmit an abuse report for a mobile message the user deems abusive, wherein the abuse report can be transmitted from the UE to the MADC 116 for processing by the MADC 116 or other components associated with the core network 114. An abuse report (e.g., abusive mobile message report) of the user also can include other information, such as originating address of the mobile message, termination address of the mobile message, time of the mobile message, etc. The MADC 116 can evaluate the received abuse report to determine whether the mobile message is an abusive message or not in accordance with the predefined message abuse criteria. If the MADC 116 identifies the mobile message as an abusive message, the MADC 116 can identify or classify the type of abusive message it is, and can implement (e.g., automatically perform) a desired responsive abuse management action(s), as more fully disclosed herein, or take no action, in response to the abusive message report based at least in part on such determination regarding the mobile message, in accordance with the predefined message abuse criteria.

In yet another aspect, a UE, such as UEs 102, 104 and/or 106, can set filters to filter mobile messages to block the receipt of certain undesired mobile messages, wherein the filters can be selected (e.g., manually by the UE user) and employed locally by a UE to locally filter or block undesired mobile messages and/or can be selected and communicated to the MADC 116 wherein the MADC 116 can apply the selected filters to block undesired mobile messages from being sent to the UE. As desired, initially, a UE (e.g., 102) can have no filters set or a set of default filter selected.

For example, a UE (e.g., 102) can block mobile messages based at least in part on the originating address (e.g., block mobile messages from specified UEs), type of content (e.g., block mobile messages having multimedia attached), content rating identifier (e.g., adult content, content suitable for persons 13 and older, content suitable for all ages, etc., wherein mobile messaging that does not meet the selected local filter relating to content rating can be blocked), information contained in the mobile message (e.g., block mobile messages that contain certain terms or phrases (e.g., mortgage, refinance, Viagra, etc.) and/or Uniform Resource Locators (URLs)), and/or other desired filter parameters. When one or more local filters have been set on the UE, the UE can evaluate a received mobile message, prior to notification of the mobile message being provided to the UE user, and can apply the local filters specified by the user (or default local filters) to the mobile message, and can determine whether to block the mobile message or not, in accordance with the filter parameters specified in the local filters. If the mobile message is to be blocked, the UE can discard the mobile message and not provide notification of the mobile message to the user. If the UE determines that the mobile message is not to be blocked, the mobile message can be presented to the user in accordance with presentation criteria specified by the user (e.g., present notification of the received mobile message to the user via the user interface).

In still another aspect, the user can set one or more local filters for the UE by accessing a local filter menu on the UE and selecting the desired local filters, or accessing the user account on the web site of the wireless service provider and selecting the desired local filters via a provided interface with a menu of available local filters, wherein the MADC 116 can communicate the desired (e.g., selected) local filters to the UE, and the UE can be configured in accordance with the desired local filters. In an embodiment, if a mobile message is locally blocked by a UE in accordance with the local filters implemented, a signal or message can be automatically or manually sent from the UE to the MADC 116 to convey to the MADC 116 specifics relating to the blocked message and indicate that the mobile message was locally blocked, and the user account associated with the UE can be credited (or not billed) for costs related to the blocked mobile message.

Figure 2:
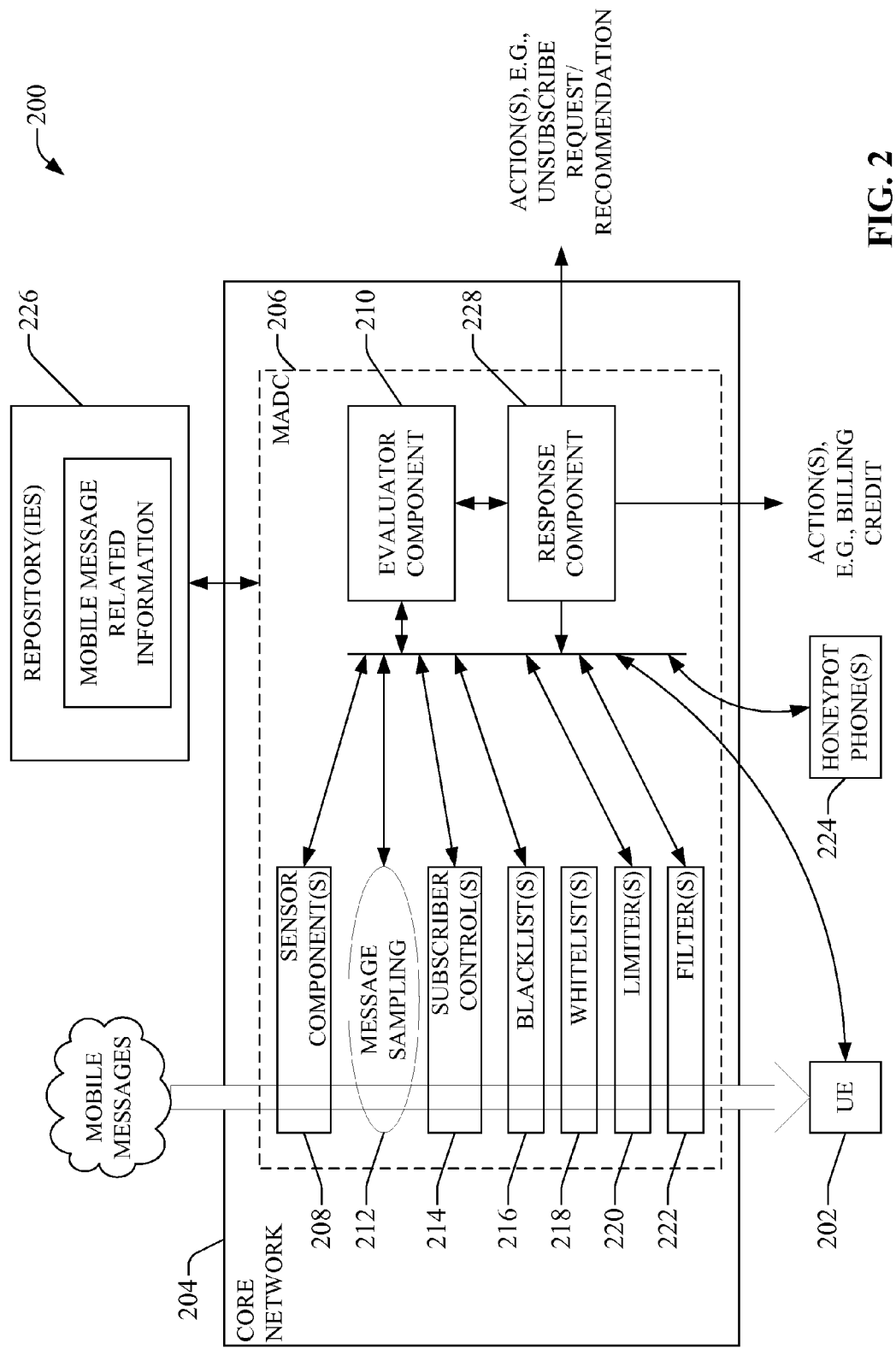
FIG. 2 depicts a block diagram of an example system and data flow that can facilitate identifying abusive mobile messages and associated abusive mobile communication device users in a communication network environment, in accordance with various aspects and embodiments of the disclosed subject matter.

Referring to FIG. 2 (along with FIG. 1), depicted is a block diagram of an example system 200 and data flow that can facilitate identifying abusive mobile messages and associated abusive mobile communication device users in a communication network environment, in accordance with various aspects and embodiments of the disclosed subject matter. The system 200 can comprise one or more UEs, including UE 202, a core network 204, and a MADC 206 that each can comprise the same or similar as, or can comprise the same or similar functionality as, respective components (e.g., respectively named or numbered components) such as more fully described herein, for example, with regard to system 100, system 300, system 400, etc.

In an aspect, mobile messages (e.g., mobile messages from other UEs (not shown)) can be communicated through the core network 204 to a UE 202. To facilitate identifying whether a mobile message or subset of mobile messages is/are abusive, what type of mobile message a particular mobile message is, what action(s), if any, to perform in response to identification of a mobile message(s) as abusive or other identifications (e.g., identification of a mobile message(s) as subscription related, identification of a mobile message(s) as "ham", etc.), etc., the MADC 206 can perform one or more desired processes on the mobile message stream, or desired portion thereof, and/or process other information relating to mobile messaging.

The MADC 206 can employ one or more sensor components 208 that can sense or detect a desired portion of mobile messages communicated through the core network 204, and can provide the desired portion of mobile messages and/or information relating to the desired portion of mobile message to an evaluator component 210, which can evaluate the mobile messages and/or other desired information (e.g., historical information, reputation information, abuse reports, honeypot reports, whitelist, mobile message content or hash information related thereto, etc.) to facilitate identifying whether a mobile message or subset of mobile messages is/are abusive, what type of mobile message a particular mobile message is, what action(s), if any, to perform in response to identification of a mobile message(s) as abusive or other identifications (e.g., identification of a mobile message(s) as subscription related, identification of a mobile message(s) as "ham", etc.), etc. In an aspect, the desired portion of mobile messages can be sensed and/or sampled by random or selective mobile message sampling 212.

In another aspect, the MADC 206 can provide for one or more subscriber controls 214 that can be employed to facilitate identification of abusive mobile messages, abuse reporting, setting and application of subscriber-selected filters to filter or block certain mobile messages, requesting an appeal with regard to action(s) taken by the MADC 206, etc. As desired, the MADC 206 can utilize one or more blacklists 216 that can be used to store addresses (e.g., MSISDNs) as specified by the MADC 206 overall or for respective UE users to globally block mobile messages from blacklisted mobile message senders on a global blacklist of the MADC 206 or block mobile messages from blacklisted mobile message senders included on respective blacklists of respective UE users.

In another aspect, the MADC 206 can provide for one or more subscriber controls 214 that can be employed to facilitate identification of trusted senders, or full or partial contents of mobile messages that make them trustworthy, and setting and application of subscriber-selected filters to allow delivery of certain mobile messages, taking precedence over a specified set of some or all of the various blocking action(s) which might otherwise be taken by the MADC 206, etc. As desired, the MADC 206 can utilize one or more whitelists 218 that can be used to store addresses (e.g., MSISDNs) of desired respective UEs as specified by the MADC 206 overall or for respective UE users to globally allow mobile messages from whitelisted mobile message senders on a global whitelist of the MADC 206 or allow mobile message from whitelisted mobile message senders included on respective whitelists of respective UE users. All or a desired portion of the one or more whitelists 218 also can be stored in, maintained by, and/or updated by the core network 204, and respective whitelists can be stored in, maintained by, and/or updated by respective UEs (e.g., 202).

In still another aspect, the MADC 206 can employ one or more limiters 220 that can be utilized to limit the number of mobile messages sent from a UE over a given period of time to facilitate reducing abusive mobile messages and/or identifying originating addresses associated with abusive mobile message senders. The one or more limiters 220 can include an initial or introductory limiter(s) (e.g., single limiter, multi-limiter) that can enforce an initial, relatively smaller limit(s) on the number of mobile messages that can be transmitted from a UE associated with a new originating address or new wireless service account over a predefined period(s) of time to reduce the ability of an abusive mobile message sender to open a new wireless service account and immediately send a lot of abusive mobile messages.

The one or more limiters 220 also can include a standard limiter(s) (e.g., single limiter, multi-limiter) that can allow more mobile messages to be sent from a UE over a given period of time than the initial filter after a predefined initial or trial period has expired since the subscriber account was opened. Further, as desired, the one or more limiters 220 can comprise other limiters that can reply respective limits on the number of mobile messages based at least in part on type of mobile message, whether the mobile message contains an URL, etc. When the number of mobile messages from an originating address associated with a UE exceeds an applicable limit on the number of mobile messages imposed by the one or more limiters 220, the MADC 206 can perform or take (e.g., automatically) one or more desired actions, including, for example, blocking or not delivering all or a portion of the mobile messages, triggering evaluation of the sent mobile messages to identify whether they are abusive (e.g., spam), quarantining or sidelining the mobile messages for a desired period of time to facilitate evaluation of the mobile messages before deciding whether to send them and/or to use as evidence against an abusive message sender, suspending the sending of mobile messages by the UE associated with the originating address, providing notification to the sending UE of any action(s) taken in response to exceeding the applicable mobile message limit, etc.

In still another aspect, the MADC can employ one or more filters 222 that can filter or block mobile messages that do not meet the filter criteria and associated specified filter parameters for delivering the mobile messages. The one or more filters 222 can comprise one or more network-implemented filters and/or one or more respective subscriber-selected filters, in accordance with the predefined message abuse criteria, such as more fully disclosed herein, wherein selection of the subscriber-selected filters can be facilitated by the one or more subscriber controls 214.

In yet another aspect, the system 200 can comprise one or more honeypot phones 224, such as more fully disclosed herein, wherein the honeypot phones 224 (and/or a component (not shown) associated therewith) can be associated with (e.g., communicatively connected to) the MADC 206, and can generate and communicate honeypot reports to the MADC 206, wherein the honeypot reports can comprise information regarding mobile messages received by the respective honeypot phones 224. The MADC 206 can evaluate the honeypot reports and/or other information relating to mobile messaging to facilitate identifying abusive mobile message senders and desired action(s) to perform in response thereto.

In still another aspect, the system 200 can include one or more repositories 226 that can be associated with (e.g., communicatively connected to, included in) the MADC 206, and can store information, including information relating to mobile messaging. For instance, the one or more repositories 226 can store information, such as historical information of respective originating addresses of UEs and UE users, reputation information of respective originating addresses and UE users, CDRs, abuse reports, reputation of an abuse reporter, information that can facilitate identifying types of mobile messaging abuse, etc. The MADC 206 can access desired information from the one or more repositories 226 to facilitate identifications relating to mobile messages (e.g., abusive mobile message identification, identification of an action(s) to perform in response to an abusive mobile message identification, etc.).

In yet another aspect, the MADC 206 can comprise a response component 228 that can perform or take a desired action(s) (e.g., abuse management action(s)) in response to identification or classification of a mobile message(s), an appeal from a subscriber, etc. For example, when the MADC 206 identifies a mobile message(s) as abusive, the response component 228 can perform a desired abuse management action(s) (e.g., blocking the mobile messages from the UE identified as sending abusive mobile messages, providing a billing credit to a recipient of an abusive mobile message, etc.) in response to such identification. As another example, when the MADC 206 determines that a request or recommendation to unsubscribe a subscriber from a subscription to a particular service (e.g., as provided by a third-party service provider) is to be communicated to the particular subscription service provider associated with the particular service, the response component 228 can transmit a request or recommendation to terminate a subscription service to the desired subscription service provider to terminate the subscription for a specified UE user or recommend that the subscription service provider terminate the subscription for the specified UE user or contact the UE user to determine whether the subscription is to be terminated.

The subject specification has a number of advantages over conventional communication systems and methods. For instance, the subject specification, by employing the unique ID to overall-mobile-message ratio, can facilitate efficiently (e.g., efficient with regard to resources used and computations, cost efficient) identifying and classifying abusive mobile messages and associated senders and taking a desired action(s) (e.g., automatically blocking abusive mobile messages, automatically crediting a mobile message recipient who received an abusive mobile message, automatically executing a desired unsubscription action to facilitate unsubscribing a UE user from a subscription service or distribution list, etc.) in response to classification of mobile messages (e.g., classification of abusive mobile messages, subscription-related mobile messages, etc.), while reducing or minimizing potential countermeasures that may be taken by abusive message senders, as compared to conventional systems and methods. For instance, an abusive message sender may learn of the unique ID to overall-mobile-message ratio and decide that a countermeasure to detection using the ratio would be to send multiple messages to each recipient UE; however, such a countermeasure can be of limited effectiveness as it can increase the probability of subscriber-initiated abuse reports (e.g., a subscriber is more likely to create and send an abuse report when the subscriber receives more than one abusive mobile message than if the subscriber only receives one abusive mobile message) and it can decrease the breadth of the abusive-mobile-message campaign (assuming a fixed sending rate), as the abusive mobile message sender has to use more resources (e.g., UE resources) to send multiple mobile messages to each recipient UE than the amount of resources used to send a single mobile message to each recipient UE, which results in fewer unique recipients receiving the abusive mobile messages over a given period of time, thereby decreasing the breadth of the abusive-mobile-message campaign. Also, the subject specification can evaluate reported abusive mobile messages to determine whether the mobile messages are actually abusive (e.g., spam), and can thereby reduce incorrectly crediting a subscriber's billing account for alleged abusive mobile messages based on false claims to obtain a credit for a subscriber's billing account, which is an improvement over conventional systems and methods. Further, the subject specification, by being able to intelligently and accurately classify mobile messages, is able overcome the shortcomings relating to subscribers reporting mobile messages as abusive or spam wherein many subscribers may not accurately report the mobile message type (e.g., classification), which is an improvement over conventional systems and methods.

Furthermore, in accordance with the subject specification, the classifying of mobile messages and associated mobile message senders, and identifying action to be taken in response can be automatic or automated, at least in most instances. Further, processing of abuse reports and appeals relating to mobile messages can be automated in most cases. As a result, the relatively high costs relating to manually handling care calls by the communication service provider can be reduced or minimized through the automation of the abuse reporting, appeal, and crediting processes, while also reducing or minimizing the potential for abuse with regarding to credits for mobile messages, any and all of which are improvements over conventional systems and methods.

The subject specification also improves processing of abuse reports, crediting of subscribers for abusive mobile messages received by subscribers, processing appeals relating to mobile messaging, as compared to conventional systems and methods, in part, by automating respective aspects of the abuse report process, crediting process, and appeal process.

In accordance with an embodiment of the disclosed subject matter, one or more components (e.g., UE, MADC, etc.) in the communication network environment can utilize artificial intelligence (AI) techniques or methods to infer (e.g., reason and draw a conclusion based at least in part on a set of metrics, arguments, or known outcomes in controlled scenarios) whether a mobile message is an abusive message; identify or classify a type of mobile message (e.g., spam, subscriber-related mobile message, "ham", etc.); a type of automated response that should be implemented in response to identification or classification of a mobile message; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired and converged (e.g., wireless and wired) communication networks. For example, desired aspects and embodiments of the subject specification can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

Figure 3:
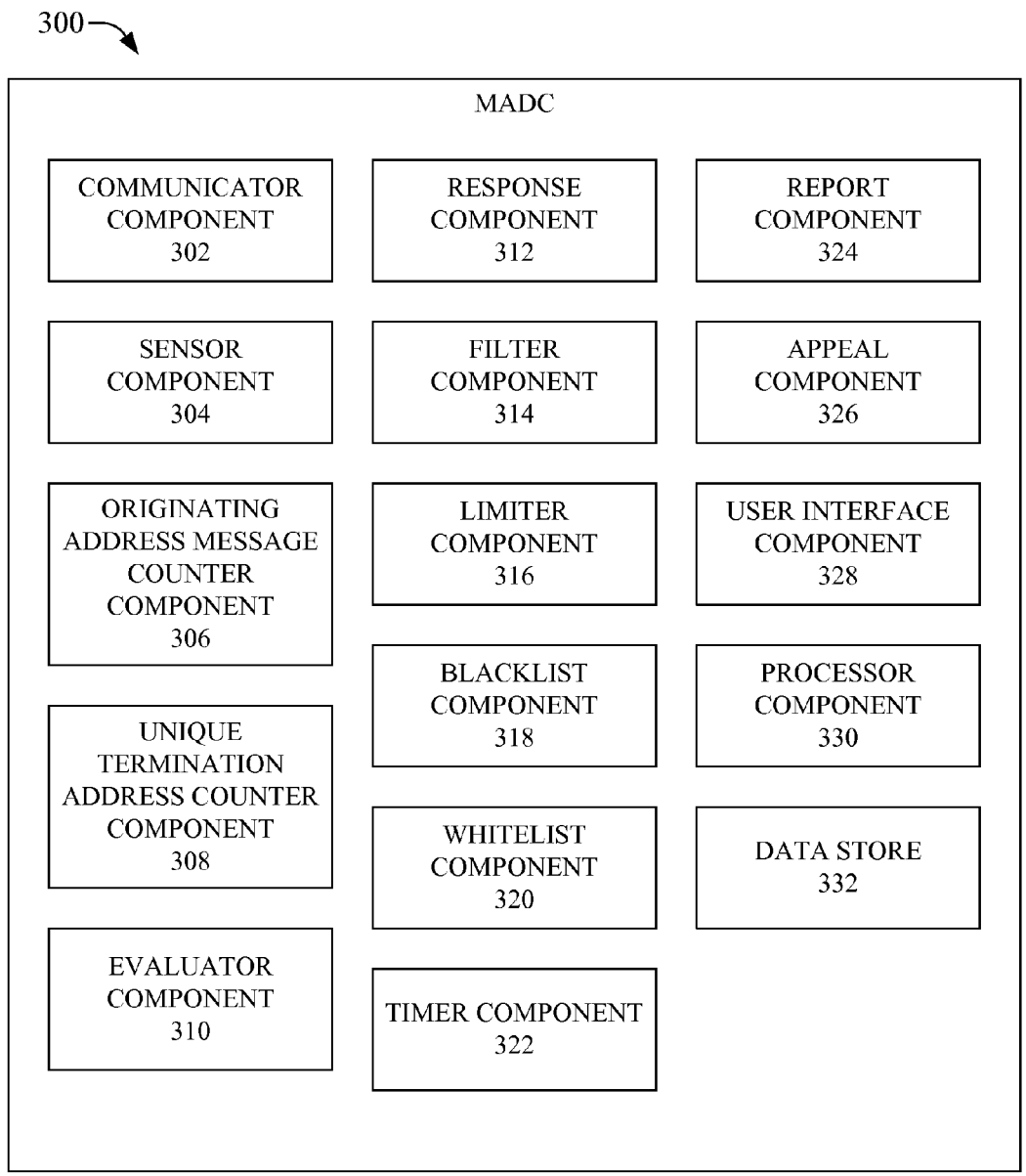
FIG. 3 illustrates a block diagram of an example message abuse detector component (MADC) in accordance with an embodiment of the disclosed subject matter.

FIG. 3 depicts a block diagram of an example MADC 300 in accordance with an embodiment of the disclosed subject matter. In an aspect, the MADC 300 can comprise a communicator component 302 that can be employed to communicate (e.g., transmit, receive) information, including information relating to mobile messages, between the MADC 300 and other components or devices, such as UEs, repositories, honeypot phones, etc.

In an aspect, the MADC 300 can include a sensor component 304 that can sense, detect, and/or sample mobile messages, including information (e.g., metadata, such as originating address associated with the mobile message, termination address associated with the mobile message, type of mobile message, content rating identifier, time of transmission of the mobile message, etc.) related thereto. The sensor component 304 can sense mobile messages randomly or selectively, as desired by the MADC 300, in accordance with the predefined message abuse criteria.

In another aspect, the MADC 300 can comprise an originating address message counter component 306 that can count the number of mobile messages transmitted from an originating address over a desired period of time or for a desired number of mobile messages. The MADC 300 can include an unique termination address counter component 308 that can count the number of unique termination (e.g., recipient) addresses in the number of mobile messages transmitted from the originating address over the desired period of time or for the desired number of mobile messages. The respective counts obtained from the originating address message counter component 306 and the unique termination address counter 308 can be utilized to facilitate determining or calculating the unique ID to overall-mobile-message ratio.

The MADC 300 can comprise an evaluator component 310 that can analyze or evaluate information, such as mobile messages, associated metadata, historical data associated with UEs or associated users, reputation associated with UEs or associated users, CDRs, abuse reports, honeypot reports, whitelists of respective subscribers, mobile message content or hash information relating thereto, etc., to facilitate identifying and/or classifying mobile messages as abusive or not, identifying a type of abusive mobile message, identifying a desired action(s) to perform in response to identification or classification of a mobile message(s), etc. The evaluator component 310 can receive respective count information from the originating address message counter 306 and unique address counter 308 to facilitate determining or calculating the unique ID to overall-mobile-message ratio and/or other mobile message related information (e.g., historical information, reputation information, CDRs, honeypot reports, abuse reports, etc.) from other sources, wherein such received information can be used to facilitate identification of mobile messages as abusive or not, identification of types of mobile messages, and identification of desired responsive action.

The MADC 300 can include a response component 312 that can implement or enforce a desired action(s) based at least in part on the results of the evaluation by the evaluator component 310 and in accordance with the predefined or learned message abuse criteria. For example, the response component 312 can automatically block mobile messages being sent by a UE, or take other desired responsive action, when the UE is identified as sending abusive mobile messages, and/or can credit the accounts of recipients of the abusive mobile messages for costs relating to receiving the abusive mobile messages.

The MADC 300 can contain a filter component 314 that can employ one or more filters to filter or block mobile messages sent from one UE to another UE through the core network. The filters employed by the filter component 314 can include filters desired by the wireless service provider and/or subscriber-selected filters, wherein the subscriber can select desired available filters via the subscriber's UE and/or another communication device (e.g., personal computer used to access the web site of the wireless service provider).

One type of filter can be, for example, a content rating filter that can filter or block a mobile message based at least in part on the selected content rating parameter value (e.g., first parameter value that allows all content; second parameter value that blocks content not suitable for users under 18 years old; third parameter value that blocks content not suitable for users under 13 years old; etc.) and a content rating identifier or MADC-determined content rating classification (e.g., first identifier or classification that indicates content is suitable for all ages; second identifier or classification that indicates that the content is not suitable for users under 18 years old; third identifier or classification that indicates content is not suitable for users under 13 years old; etc.) associated with a mobile message. Another filter type of filter can be a address-specific filter that can block mobile messages (or calls) from a UE associated with a particular address, for example, as desired by a subscriber. Still another filter can be a content filter that can block mobile messages that contain, for example, multimedia or URLs. The above-referenced filters are but a few examples of the filters that can be employed by the filter component 314, and it is to be appreciated and understood that the subject specification is not limited to the above-referenced filters, but can employ virtually any desired filter such as is known in the art, for example.

In still another aspect, the MADC 300 also can comprise a limiter component 316 that can employ one or more limiters (e.g., single limiter, multi-limiter) to limit the number of mobile messages sent by a particular UE over an applicable period of time. For instance, the limiter component 316 can employ one or more initial or introductory limiters that can be used to limit the number of mobile messages sent by a UE of a new subscriber during an introductory period for the new wireless service account, wherein there can be, for example, an hourly limit, a daily limit, an overall limit, and/or another desired limit on the number of mobile messages sent by the UE during the applicable time period (e.g., hour, day, month, etc.) during the introductory period. The limiter component 316 also can employ one or more standard limiters that can limit the number of mobile messages for UEs that are no longer in the introductory period, wherein the mobile message limits of the standard limiter(s) typically can allow for more mobile messages to be sent by a UE for a given applicable time period than the initial limiter(s).

In an embodiment, the MADC 300 optionally can include a blacklist component 318 that can contain one or more blacklists (e.g., global blacklist, blacklists of respective subscribers), wherein, for example, a particular blacklist of a subscriber can include one or more UE addresses that the subscriber desires to have blocked so that the subscriber's UE does not receive mobile messages and/or calls from the blacklisted UE. The blacklist component 318 can facilitate enabling a blacklist to be updated and stored, as desired. The blacklist component 318 can operate in conjunction with the filter component 314 to filter or block undesired mobile messages or calls from UEs associated with UE addresses that are listed on the applicable blacklist.

In an embodiment, the MADC 300 optionally can include a whitelist component 320 that can contain one or more whitelists (e.g., global whitelist, whitelists of respective subscribers), wherein, for example, a particular whitelist of a subscriber can include one or more UE addresses that the subscriber desires to have delivered so that the subscriber's UE receives mobile messages and/or calls which might otherwise be blocked by one or more filter components 314 of MADC 300. The whitelist component 320 can facilitate enabling a whitelist to be updated and stored, as desired. The whitelist component 320 can operate in conjunction with the filter component 314 to bypass one or more types of filtering of messages from UEs associated with UE addresses that are listed on the applicable whitelist.

In an aspect, the MADC 300 can employ a timer component 322 that can track respective amounts of time in relation to respective time periods applicable for respective limiters employed by the limiter component 316. The timer component 322 also can document or indicate (e.g., time stamp) respective times that respective mobile messages are sent by UEs or received by UEs to facilitate evaluation, by the evaluator component 310, of use of mobile messaging by respective UEs.

The MADC 300 can comprise report component 324 that can facilitate providing mechanisms (e.g., abuse report button, abuse report menu) for creating abuse reports to UEs. The report component 324 also can receive abuse reports and associated information from UEs and can process the abuse reports to facilitate providing desired abuse report information to the evaluator component 310 for evaluation, as desired.

In still another aspect, the MADC 300 can contain an appeal component 326 that can process appeals (e.g., automatically process and respond to appeals) relating to decisions made and/or actions taken by the MADC 300 with regard to mobile messaging. When the MADC 300 takes or performs an action, such as blocking mobile messages, identifying or not identifying mobile messages as abusive, crediting or not crediting a subscriber account in relation mobile messaging costs, etc., if a subscriber believes such action is not correct, the subscriber can use the UE or other communication device to generate and send an appeal to dispute the action taken by the MADC 300. The appeal component 326 can receive the appeal and can automatically facilitate processing the appeal, as the appeal component 326 can provide relevant appeal-related information to the evaluator component 310 and/or other components of the MADC 300 to facilitate processing the appeal (e.g., the evaluator component 310 can perform a more in-depth evaluation of information relating to the mobile messaging that is the subject of the appeal than the evaluation initially performed which resulted in the initial action taken by the MADC 300). The appeal component 326 also can facilitate providing (e.g., automatically providing) a response or decision on the appeal to the subscriber's UE or other desired destination (e.g., subscriber's email address).

In accordance with an embodiment, the MADC 300 optionally can contain a user interface component 328 that can be used to display provide information to an administrator, a technician, or other desired person associated with the wireless service provider to facilitate manual review of information relating to mobile messaging to facilitate evaluation of such information, identification or classification of use of mobile messaging, identifying or initiating a desired responsive action, deciding an appeal, etc., for example, when the MADC 300 is not able to automatically perform a particular function. The user interface component 328 also can receive input of information from the administrator, technician, or other desired person to facilitate accessing desired information, manually taking one or more actions relating to mobile messaging, communicating with a UE, etc. The user interface 328 further can be used to control (e.g., adjust, modify) parameter values (e.g., mobile messaging limits, filter parameters, etc.) for components of the MADC 300.

In yet another aspect, the MADC 300 can comprise a processor component 330 that can work in conjunction with the other components (e.g., communicator component 302, sensor component 304, originator message counter 306, unique ID counter 308, evaluator component 310, response component 312, filter component 314, limiter component 316, (optional) blacklist component 318, (optional) whitelist component 320, timer component 322, report component 324, appeal component 326, (optional) user interface component 328, etc.) to facilitate performing the various functions of the MADC 300. The processor component 330 can employ one or more processors, microprocessors, or controllers that can process data, such as information relating to mobile messaging by UEs in the core network, information relating to operations of the MADC 300, and/or other information, etc., to facilitate operation of the MADC 300, as more fully disclosed herein, and control data flow between the MADC 300 and other components (e.g., UE, other components in the core network, etc.) associated with the MADC 300.

The MADC 300 also can include a data store 332 that can store data structures (e.g., user data, metadata); code structure(s) (e.g., modules, objects, hashes, classes, procedures) or instructions; information relating to mobile messaging associated with UEs operating in the core network, information relating to operations of the MADC 300, whitelists of respective subscribers, blacklists (e.g., of respective subscribers or global blacklist), predefined message abuse criteria (and associated predefined message abuse rules), predefined message routing rules, etc., to facilitate controlling operations associated with the MADC 300, etc. In an aspect, the processor component 330 can be functionally coupled (e.g., through a memory bus) to the data store 332 in order to store and retrieve information desired to operate and/or confer functionality, at least in part, to the communicator component 302, sensor component 304, originator message counter 306, unique ID counter 308, evaluator component 310, response component 312, filter component 314, limiter component 316, (optional) blacklist component 318, (optional) whitelist component 320, timer component 322, report component 324, appeal component 326, (optional) user interface component 328, and/or substantially any other operational aspects of the MADC 300.

Figure 4:
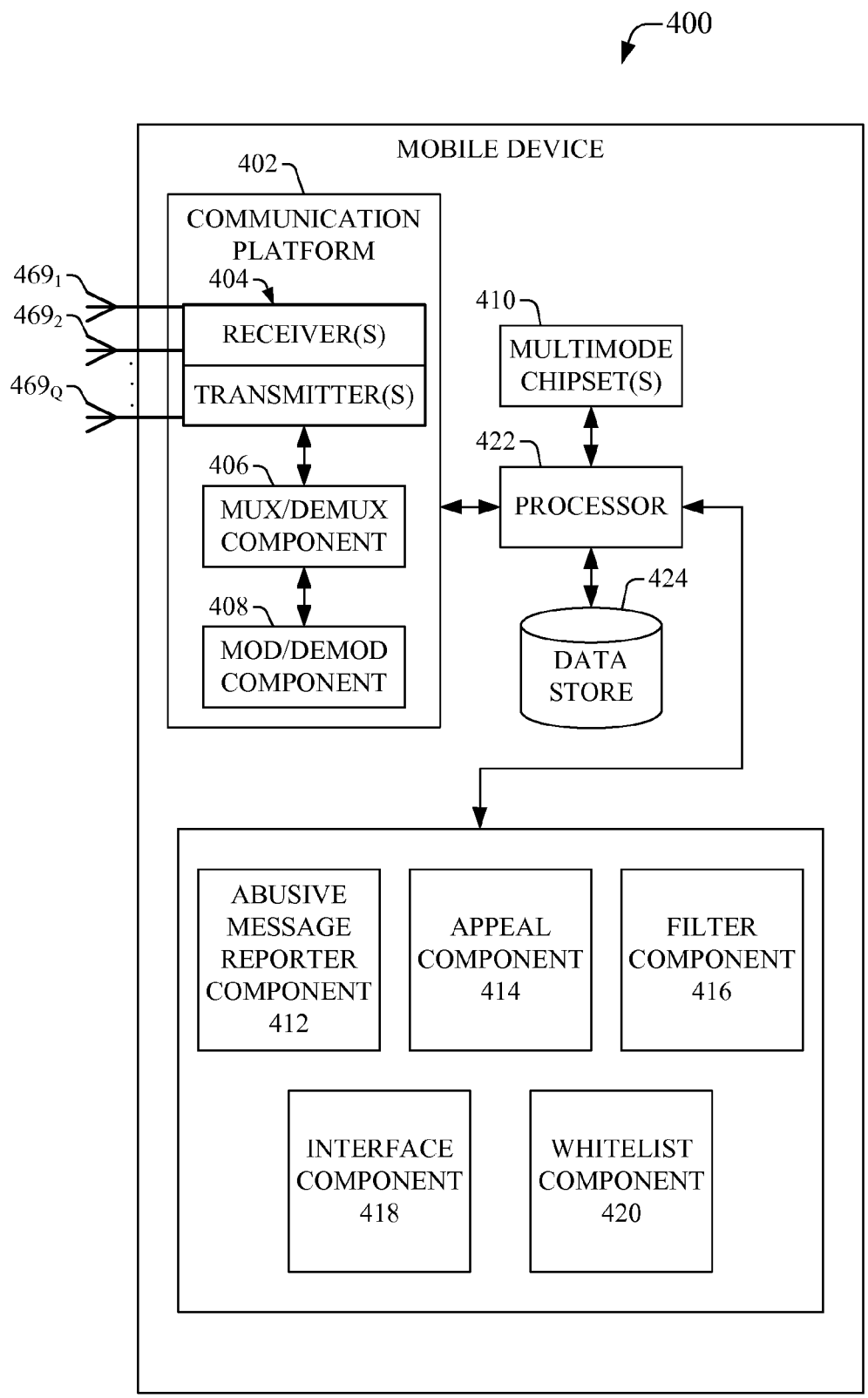
FIG. 4 depicts a block diagram of an example mobile device in accordance with an aspect of the disclosed subject matter.

FIG. 4 depicts a block diagram of an example mobile device 400 (e.g., UE) in accordance with an aspect of the disclosed subject matter. In an aspect, the mobile device 400 can be a multimode access terminal, wherein a set of antennas $469_1$-$469_Q$ (Q is a positive integer) can receive and transmit signal(s) from and to wireless devices like access points, access terminals, wireless ports and routers, and so forth, that operate in a radio access network. It should be appreciated that antennas $469_1$-$469_Q$ are a part of communication platform 402, which comprises electronic components and associated circuitry that provide for processing and manipulation of received signal(s) and signal(s) to be transmitted; e.g., receivers and transmitters 404, multiplexer/demultiplexer (mux/demux) component 406, and modulation/demodulation (mod/demod) component 408.

In another aspect, the mobile device 400 can include a multimode operation chipset(s) 410 that can allow the mobile device 400 to operate in multiple communication modes in accordance with disparate technical specification for wireless technologies. In an aspect, multimode operation chipset(s) 410 can utilize communication platform 402 in accordance with a specific mode of operation (e.g., voice, GPS). In another aspect, multimode operation chipset(s) 410 can be scheduled to operate concurrently (e.g., when Q>1) in various modes or within a multitask paradigm.

In still another aspect, the mobile device 400 can comprise an abusive message reporter component 412 that can receive information from a user of the mobile device 400 relating to mobile messaging. For instance, the abusive message reporter component 412 can facilitate providing, via an interface, an abusive mobile message button or menu and/or a region where additional information relating to the abuse report can be received so that the user can generate an abuse report for a mobile message the user deems abusive. The abusive message reporter component 412 also can facilitate communicating the abuse report from the mobile device 400 to the MADC for processing. An abuse report (e.g., abusive mobile message report) of the user also can include other information, such as originating address of the mobile message, termination address of the mobile message, time of the mobile message, etc.

In yet another aspect, the mobile device 400 also can contain an appeal component 414 that can facilitate appealing a decision or action taken by the MADC or associated wireless service provider with regard to mobile messaging or other services provided by the wireless service provider, wherein the MADC can automatically process the appeal. The appeal component 414 can facilitate providing, via an interface, an appeal button or menu and/or a region where additional information relating to the appeal can be received so that the user can generate the appeal and transmit it to the MADC for processing. The appeal component 414 also can be employed to facilitate receiving (e.g., automatically receiving) and presenting a response to the appeal from the MADC. In another aspect, as desired, the appeal component 414 can be accessed via a web site (e.g., web site of the wireless service provider) and/or a phone-based control panel.

In an aspect, the mobile device 400 can include a filter component 416 that can employ one or more filters locally on the mobile device 400 or facilitate of selection and implementation of one or more filters by the MADC to filter undesired mobile messages based at least in part on type of filter(s) employed. The filters can be an address filter that can block mobile messages or calls from specified UE addresses. In an embodiment, when desired, a blacklist (not shown) optionally can be used in conjunction with the address filter to facilitate blocking mobile messages or calls from the UE addresses specified in the blacklist, wherein the address filter can use the UE addresses specified in the blacklist to identify the UE addresses for which mobile messaging is to be blocked. Other types of filters can include, for example, content filters, content rating filters, etc.

When employing local filters on the mobile device 400, the filter component 416 can evaluate a received mobile message, prior to notification of the mobile message being provided to the mobile device user, and can apply the filters specified by the user (or default filters) to the mobile message, and can determine whether to block the mobile message or not. If the mobile message is to be blocked, the filter component 416 can discard the mobile message and not provide notification of the mobile message to the user; and if the filter component 416 determines that the mobile message is not to be blocked, the mobile message can be presented to the user in accordance with the presentation criteria specified by the user (e.g., present notification of the received mobile message to the user via a desired interface).

The mobile device 400 can contain an interface component 418 that can comprise one or more interfaces (e.g., display screens, touch screens, buttons, controls, switches, adapters, connectors, speakers, etc.) that can be utilized to facilitate presentation of information to a mobile device user or receiving data input from a mobile device user. In an aspect, the interface component 418 can present mobile messages or information related to mobile messages to the mobile device user. For example, the interface component 418 can operate in conjunction with the abusive message reporter component 412 or the appeal component 414 to facilitate presentation of buttons, controls, or menus to facilitate generating and sending an abuse report, or generating and sending an appeal, to the MADC. As another example, the interface component 418 can operate in conjunction with the filter component 416 to set or employ desired filters locally on the mobile device 400 and/or at the MADC. In an aspect, the interface can receive input, via manipulation of buttons, controls, or menus by the mobile device user to facilitate setting one or more desired filters for the mobile device 400, and the mobile device can be configured in accordance with the desired filters, when the filters are local filters. In an embodiment, if a mobile message is locally blocked by the mobile device 400 in accordance with the local filters implemented, the interface component 418 can facilitate automatic or manual transmission of a signal or message from the mobile device 400 to the MADC to convey to the MADC that the mobile message was locally blocked, and the user account associated with the mobile device 400 can or may be credited (or not billed) for costs related to the blocked mobile message, in accordance with the predefined message abuse criteria.

In an embodiment, the mobile device 400 optionally can include a whitelist component 420 that can generate, maintain, and/or update a whitelist that can be used to store addresses (e.g., MSISDNs) of respective UEs, as specified, for example, by the mobile device user, to allow mobile messages from whitelisted mobile message senders on the whitelist. In an aspect, all or a desired portion of the whitelist also can be stored in, maintained by, updated by, and/or synchronized with respective whitelists stored in the core network and/or MADC. In another aspect, as desired, adding an address of a UE to the whitelist associated with the mobile device 400 can enable the mobile device 400 to receive mobile messages or calls from the added address, even if mobile messages or calls from the address would otherwise have been filtered by a filter activated by the mobile device 400 or MADC. Also, during an evaluation of a mobile message associated with an originating address, an MADC can evaluate the addresses and other information contained in the whitelist of the mobile device 400 to facilitate classifying the mobile message (e.g., an originating address being on the whitelist of the mobile device 400 can be indicative of the mobile message not being an abusive mobile message at least in relation to the mobile device 400).

In still another aspect, the mobile device 400 also can include a processor(s) 422 that can be configured to confer functionality, at least in part, to substantially any electronic component within the mobile device 400, in accordance with aspects of the subject innovation. For example, the processor(s) 422 can facilitate enabling the mobile device 400 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 422 can facilitate enabling the mobile device 400 to process data relating to mobile messaging, voice calls, or other services (e.g., Internet services or access, services related to applications, etc.).

The mobile device 400 also can contain a data store 424 that can store data structures (e.g., user data, metadata); code structure(s) (e.g., modules, objects, classes, procedures) or instructions; message hashes; neighbor cell list; whitelist;

blacklist; information relating to mobile messaging, voice calls, or other services; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 422 can be functionally coupled (e.g., through a memory bus) to the data store 424 in order to store and retrieve information (e.g., neighbor cell list; information relating to mobile messaging, voice calls, or other services; frequency offsets; desired algorithms; etc.) desired to operate and/or confer functionality, at least in part, to communication platform 402, multimode operation chipset(s) 410, abusive message reporter component 412, appeal component 414, filter component 416, interface component 418, and (optional) whitelist component 420, and/or substantially any other operational aspects of the mobile device 400.

FIGS. 5A, 5B, and 5C illustrate example interface displays in accordance with embodiments of the disclosed subject matter. The UE (e.g., mobile device) can facilitate presentation of the interface displays, and associated buttons, controls, or menus, for example, using an interface component, such as more fully described herein with regard to mobile device 400. FIG. 5A depicts an example interface display 500 that can facilitate presenting a UE user with the option of generating an abuse report relating to a received mobile message. The interface display 500 can include a message region 502 that can present (e.g., display) a received mobile message or a mobile message being composed by the UE user. For a received mobile message, the interface display 500 also can include an abuse report region 504 wherein an abuse report can be initiated, generated, and transmitted. The UE user can initiate an abuse report by entering input (e.g., selecting a button on a keypad or touch screen) that selects a control to initiate an abuse report. For example, the UE user can select the "abuse report" control 506 on the interface display 500 (e.g., when the interface display 500 is also a touch screen) to initiate the abuse report. The abuse report region 504 optionally can comprise an abuse information region 508 wherein the UE can receive information from the user via the interface component that can be inserted in the abuse information region 508 to provide the MADC with additional information regarding the mobile message being reported as abusive. Additionally, or alternatively, the abuse information region 508 can include available selections of predefined information (e.g., spam selection, harassing message selection, etc.) that the UE user can select in order to provide reasons or additional information relating to the abuse report. The abuse report region 504 also can include a send control 510 that can be manipulated and/or selected by the UE user to send the abuse report to the MADC for processing by the MADC.

FIG. 5B illustrates an example interface display 520 that can facilitate presenting a UE user with the option of generating and sending an appeal relating to a decision or action taken by the MADC or associated wireless service provider with regard to a mobile message(s) sent or received by the UE user. The interface display 520 can include a message region 522 that can present (e.g., display) a received message, for example, from the MADC, regarding a decision and/or action taken by the MADC and/or wireless service provider. The interface display 520 also can include an appeal region 524 wherein an appeal can be initiated, generated, and transmitted. The UE user can initiate an appeal by entering input (e.g., selecting a button on a keypad or touch screen) that selects a control to initiate the appeal. For example, the UE user can select or touch the "appeal" control 526 on the interface display 520 (e.g., when the interface display 520 is also a touch screen) to initiate the appeal. The appeal region 524 optionally can comprise an appeal information region 528 wherein the UE can receive information from the user via the interface component that can be inserted in the appeal information region 528 to provide the MADC with additional information regarding the appeal (e.g., reasons for the appeal). Additionally, or alternatively, the appeal information region 528 can include available selections of predefined information (e.g., "I should have received a credit", "My mobile messaging should not have been suspended", etc.) that the UE user can select in order to provide reasons or additional information relating to the appeal. The appeal region 524 also can include a "send" control 530 that can be manipulated and/or selected by the UE user to send the appeal to the MADC for processing by the MADC.

FIG. 5C illustrates an example interface display 540 that can facilitate presenting a UE user with the available filters for selection, as desired, by a UE user. In an aspect, the interface display 540 can comprise one or more filter controls, such as, for example, content rating filter control 542, a content filter control 544, an address-specific filter control 546, and/or other filter(s) control 548, wherein the user can select one or more of the desired filter controls to select one or more the desired corresponding filters to filter mobile messages being sent to the UE locally on the UE and/or by the MADC. When the UE user has selected the desired filters, the "save changes" control 550 can be selected by the UE user to save the desired filter settings and facilitate configuring the UE to implement the selected filters and/or transmit information relating to the selected filters to the MADC. When the filter is a local filter, selection of the local filter (when the selection is a saved change) can initiate configuration of the UE to use the selected local filter. When the filter is one that is implemented by the MADC, the UE can transmit information relating to the selected filters to the MADC, wherein the MADC can be configured to implement the selected filters and filter mobile messages in accordance with the selected filters.

Figure 6:
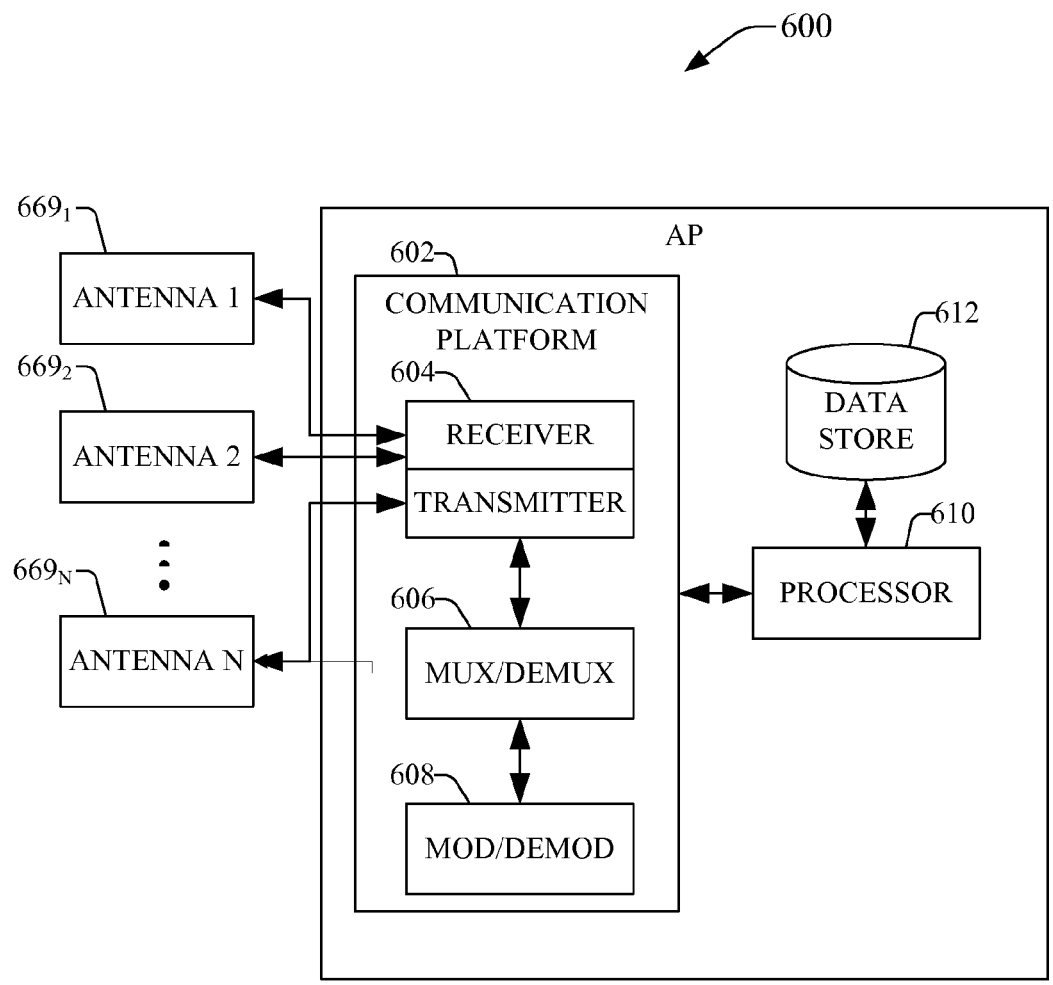
FIG. 6 illustrates a block diagram of an example access point (AP) in accordance with an aspect of the disclosed subject matter.

FIG. 6 illustrates a block diagram of an example AP 600 (e.g., femtocell, picocell, base station, etc.) in accordance with an aspect of the disclosed subject matter. The AP 600 can receive and transmit signal(s) from and to wireless devices like access points (e.g., femtocells, picocells, base stations, etc.), access terminals (e.g., UEs), wireless ports and routers, and the like, through a set of antennas $669_1$-$669_N$. In an aspect, the antennas $669_1$-$669_N$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-ary quadrature amplitude modulation (QAM), with M a positive integer), phase-shift keying (PSK), and the like.

The AP 600 also can comprise a processor(s) 610 that can be configured to confer and/or facilitate providing functionality, at least partially, to substantially any electronic component in or associated with the AP 600. For instance, the processor(s) 610 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 610 also can facilitate other operations on data to facilitate managing or maintaining a white list that includes information, such as communication device identifiers associated with communication devices that can connect to the AP 600 to communicate voice or data, etc.

In another aspect, the AP 600 can include a data store 612 that can store data structures; code instructions; rate coding information; information relating to measurement of radio link quality or reception of information related thereto; information relating to establishing a communications connection between a UE and other communication device, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 610 can be coupled to the data store 612 in order to store and retrieve information (e.g., information, such as algorithms, relating to multiplexing/demultiplexing or modulation/demodulation, information relating to radio link levels, information relating to establishing communication connections associated with a UE(s) served by the AP 600, information relating to the white list, etc.) desired to operate and/or confer functionality to the communication platform 602, and/or other operational components of AP 600.

In view of the example systems described herein, example methodologies that can be implemented in accordance with the disclosed subject matter can be better appreciated with reference to flowcharts in FIGS. 7-13. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 7:
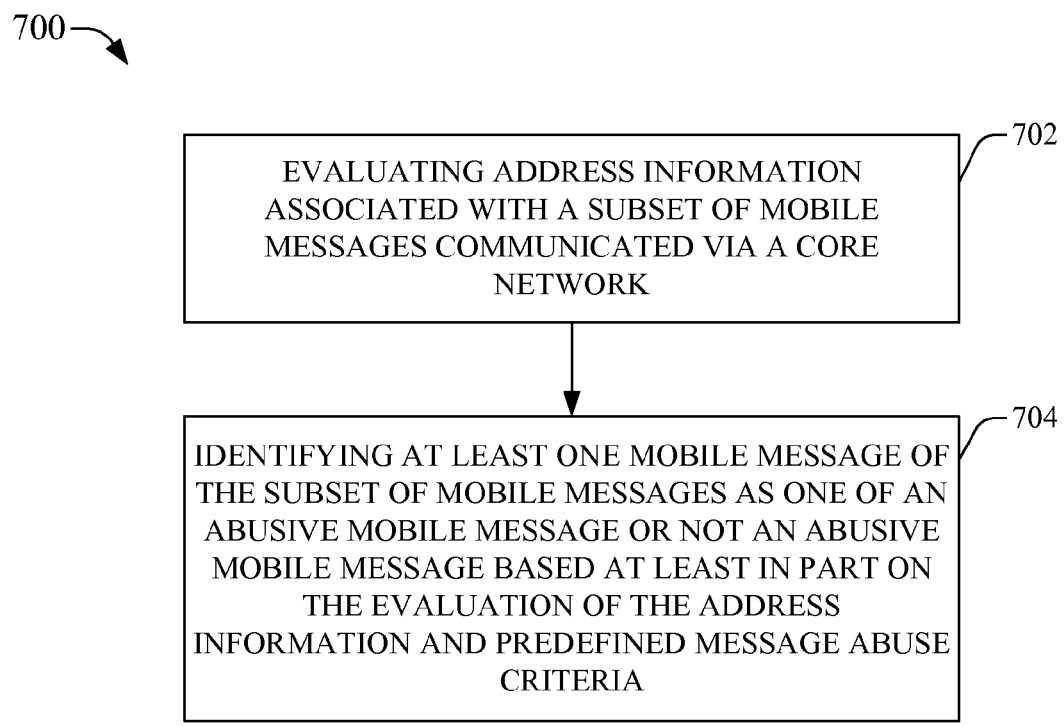
FIG. 7 illustrates a flowchart of an example methodology that can identify abusive mobile messages in accordance with various aspects and embodiments of the disclosed subject matter.

FIG. 7 presents a flowchart of an example methodology 700 that can identify abusive mobile messages in accordance with various aspects and embodiments of the disclosed subject matter. At 702, address information associated with a subset of mobile messages communicated via a core network can be evaluated. For example, a subset of mobile messages can be randomly or selectively (e.g., by originating address or termination address) selected of sampled from a mobile message stream of mobile messages being communicated between UEs via the core network in a communication network environment. As desired, to facilitate reducing undesired or unnecessary evaluations of mobile messages, the MADC can identify high-count mobile message senders from the sampled subset of mobile messages (e.g., identify originating address(es) that have sent at least the predefined high-count threshold number of mobile messages applicable for the given period of time (e.g., one minute, one hour, one day, one week, . . . )) covered by the message sampling. As desired, the MADC also can obtain additional information relating to mobile messaging of a high-count mobile message sender, wherein the additional information can comprise, for example, additional samples of mobile messaging from other time periods, CDRs, abuse reports, other historical information relating to the originating address, reputation, subscriber whitelists, hash information relating to mobile message content, etc., to facilitate accurately identifying or classifying a mobile message(s) as an abusive mobile message(s) or not, and identifying or classifying an originating address, and associated UE and user, as an abusive mobile message sender or not an abusive mobile message sender.

At 704, at least one mobile message of the subset of mobile messages can be identified or classified as an abusive mobile message or not an abusive mobile message, and an associated mobile message sender can be classified as an abusive mobile message sender or not an abusive mobile message sender, based at least in part on the evaluation of the address information and predefined message abuse criteria. Based at least in part on evaluation of the sampled subset mobile messages and/or, when desired, the additional information relating to mobile messages, a mobile message, and associated mobile message sender, can be identified or classified as being abusive or not abusive. In an embodiment, to facilitate the evaluation, the unique ID to overall-mobile-message ratio can be employed and such ratio can be computed using address information from the sampled subset of mobile messages and/or additionally sampled mobile messages and/or for previous mobile messages contained in CDRs, wherein a relatively high ratio value (e.g., at or above the predefined threshold ratio level indicative of mobile message abuse) can be indicative of abusive sending of mobile messages.

The decision regarding whether to identify or classify a mobile message(s) associated with an originating address as being abusive can be made (e.g., automatically by the MADC) based at least in part on the results of the unique ID to overall-mobile-message ratio and/or other evaluation (e.g., evaluation of historical information, CDRs, reputation, abuse reports, mobile message content (e.g., hash information related thereto), and/or honeypot reports, etc., associated with the origination address). In an aspect, a desired action(s) (e.g., abuse management action(s)) can be (e.g., automatically) performed or executed, or no action can be performed or taken, in response to the decision as to whether a mobile message(s) associated with an originating address is identified as being abusive or not, in accordance with the predefined message abuse criteria.

Figure 8A:
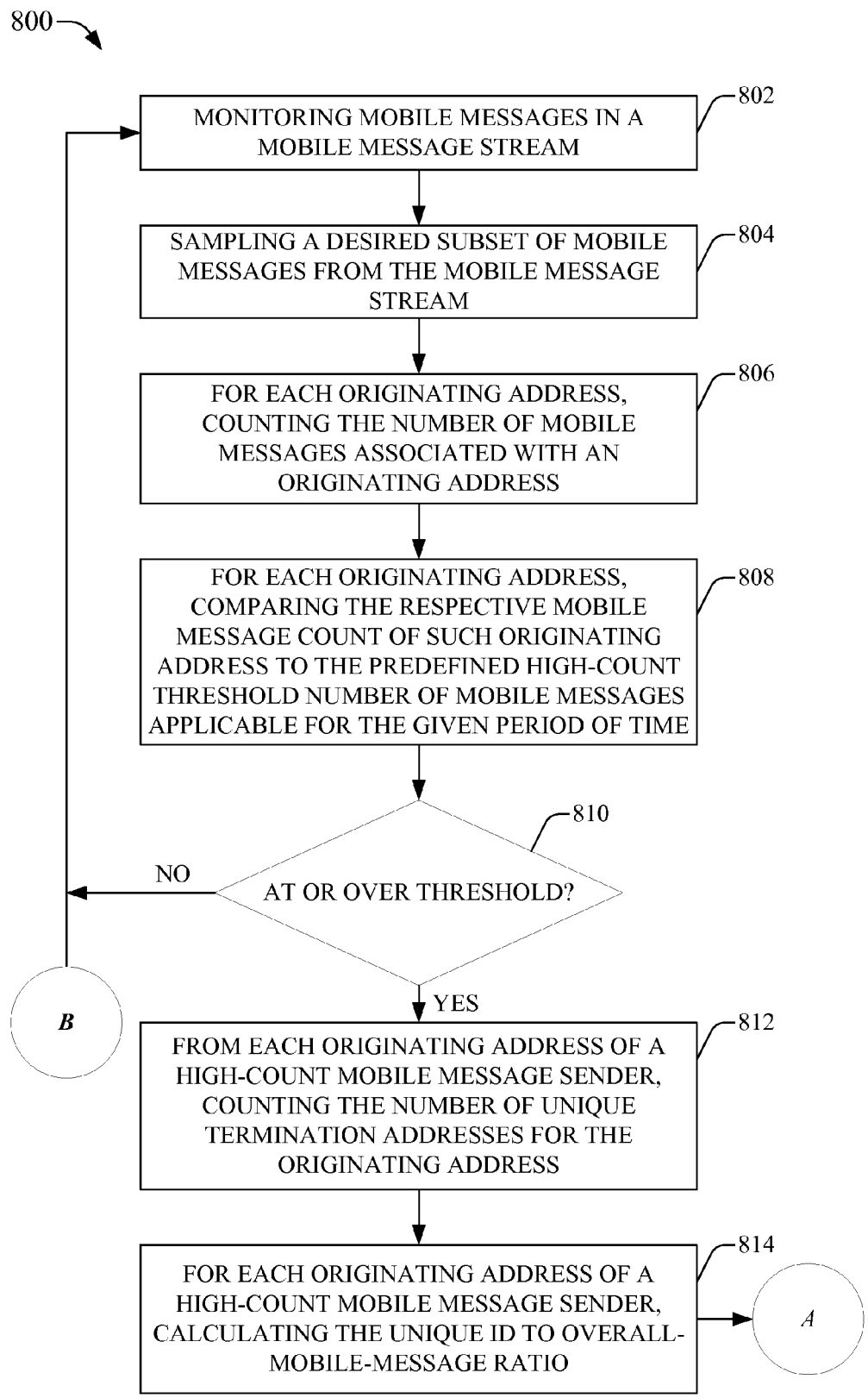
FIGS. 8A and 8B depict a flowchart of an example methodology that can identify abusive mobile messages in accordance with another aspect of the disclosed subject matter.
Figure 8B:
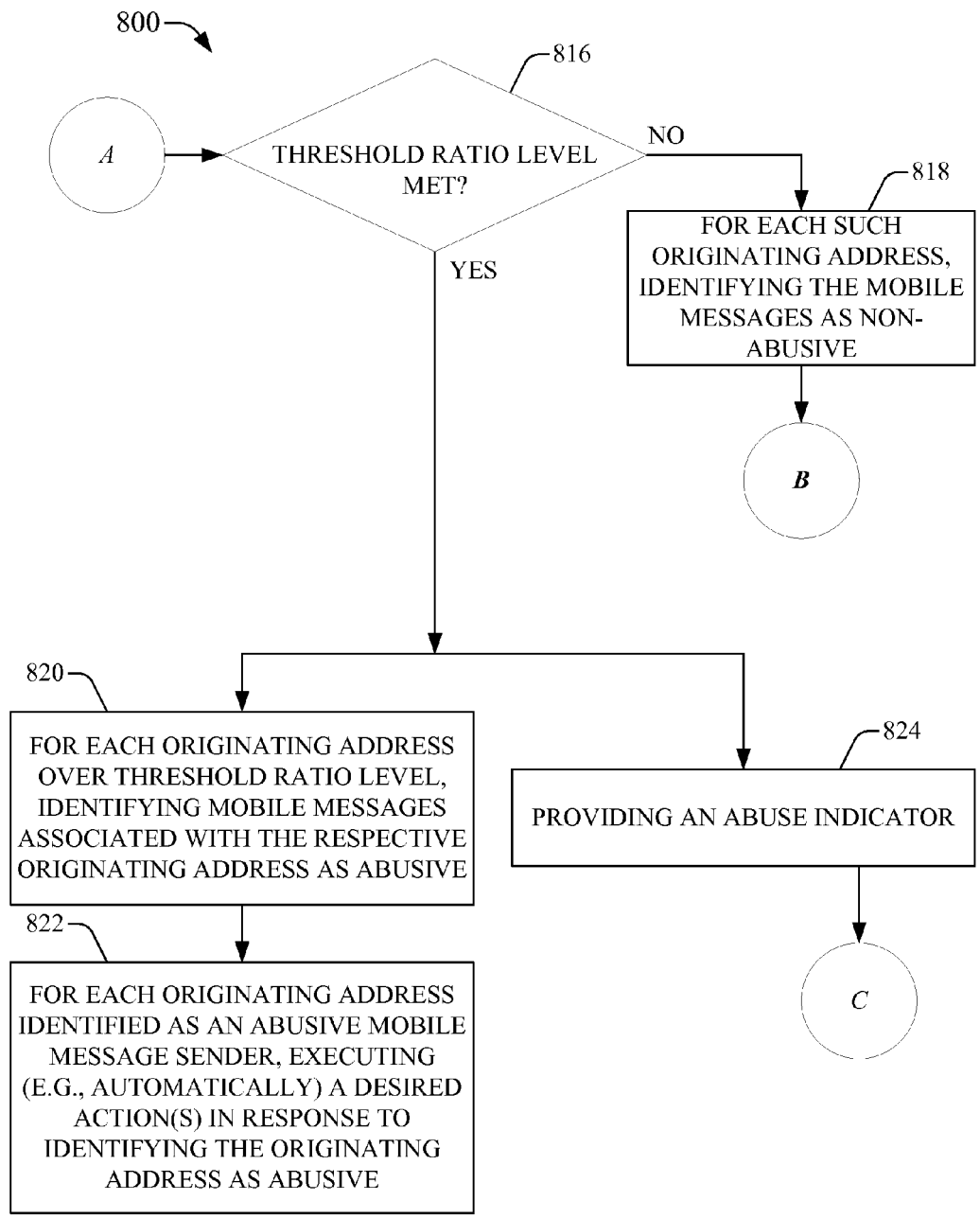

FIGS. 8A and 8B illustrate a flowchart of an example methodology 800 that can identify abusive mobile messages in accordance with another aspect of the disclosed subject matter. At 802, mobile messages can be monitored in a mobile message stream. In an aspect, the MADC can monitor mobile messages communicated between UEs via the core network in a communication network environment.

At 804, a desired subset of mobile messages can be sampled or selected (e.g., randomly or selectively) from the mobile message stream. In one aspect, the MADC can sense, detect, and/or sample a desired subset of mobile messages from the mobile message stream. The subset can comprise a desired number of mobile messages, and the sampling of the subset can span a desired time window (e.g., one hour, one day, one week, etc.) and can be performed randomly (e.g., at random times, for random amounts of time, to sample random and various amounts of messages, etc.) or selectively (e.g., selecting a sample of mobile messages per a request or in response to an abuse report associated with an originating address).

At 806, for each originating address respectively associated with one or more of the sampled mobile messages, the number of mobile messages associated with an originating address can be counted. At 808, the respective mobile message count of each originating address can be compared to the predefined or learned high-count threshold number of mobile messages applicable for the given period of time (e.g., given time window) to facilitate identifying or determining whether any originating address and associated UE is a high-count mobile message sender.

At 810, for each originating address, a determination can be made regarding whether to identify or classify the originating address and associated UE as a high-count mobile message sender. If it is determined that the number of mobile messages sent from an originating address is below the predefined or learned high-count threshold number of mobile messages applicable for the given period of time, based at least on the comparison of act 808, no further evaluation is desired or necessary, as the originating address is not associated with a high-count mobile message sender, and the methodology 800 can return to act 802, wherein mobile messages can continue to be monitored.

If, at 810, it is determined that the number of mobile messages sent from an originating address is at or above the predefined or learned high-count threshold number of mobile messages applicable for the given period of time, based at least on the comparison of act 808, the originating address can be identified as being associated with a high-count mobile message sender, and at 812, from the mobile messages respectively associated with each originating address of a high-count mobile message sender, the number of unique termination addresses can be counted for each originating address.

At 814, for each originating address of a high-count mobile message sender, the unique ID to overall-mobile-message ratio can be calculated. At this point methodology 800 can proceed to reference point A, wherein methodology 800 can continue from reference point A, as depicted in FIG. 8B.

As depicted in FIG. 8B, at 816, for each originating address of a high-count mobile message sender, a determination can be made regarding whether the unique ID to overall-mobile-message ratio at least meets the predefined threshold ratio level indicative of mobile message abuse. With regard to each originating address, if it is determined that the unique ID to overall-mobile-message ratio for an originating address of a high-count mobile message sender is below the predefined or learned threshold ratio level indicative of mobile message abuse, at 818, mobile messages associated with the respective originating address can be identified or classified as non-abusive, and the originating address and associated UE (and associated mobile message sender) can be identified or classified as a non-abusive mobile message sender. From act 818, methodology 800 can proceed to reference point B, wherein methodology 800 can proceed from reference point B in FIG. 8A to act 802, wherein mobile messages can continue to be monitored.

Referring again to act 816, as shown in FIG. 8B, if it is determined that the unique ID to overall-mobile-message ratio for an originating address of a high-count mobile message sender is at or above the predefined or learned threshold ratio level indicative of mobile message abuse, methodology can proceed to act 820 or to act 824, as desired.

For instance, with regard to each originating address, if, at 816, it is determined that the unique ID to overall-mobile-message ratio for an originating address of a high-count mobile message sender is at or above the predefined or learned threshold ratio level indicative of mobile message abuse, at 820, for each originating address at or above the predefined or learned threshold ratio level indicative of mobile message abuse, mobile messages associated with the respective originating address can be identified or classified as abusive, and the originating address and associated UE (and associated mobile message sender) can be identified or classified as an abusive mobile message sender. At 822, for each originating address identified or classified as an abusive mobile message sender, and/or mobile message classified as abusive, a desired action(s) can be executed (e.g., automatically) in response to identifying or classifying the originating address as abusive. The desired action(s) (e.g., abuse management action) can comprise, for example, content blockage (e.g., blocking the mobile messages and/or future mobile messages from the originating address), service shutdown for the originating address (e.g., shutdown mobile messaging for the mobile communication device associated with the originating address), SIM shutdown (e.g., shutdown SIM card of the mobile communication device to shutdown operation of the mobile communication device associated with the originating address), quarantine or sideline the abusive mobile messages, credit a recipient(s) of an abusive mobile message (s), blacklist the originating address and associated mobile communication device, generate and communicate abuse reports relating to the originating address to analysts, other carriers, vendors and/or content providers, etc.

Alternatively, with regard to each originating address, if, at 816, it is determined that the unique ID to overall-mobile-message ratio for an originating address of a high-count mobile message sender is at or above the predefined or learned threshold ratio level indicative of mobile message abuse, at 824, an abuse indicator (e.g., signal or flag) can be provided, wherein the abuse indicator can signify that the results of the unique ID to overall-mobile-message ratio are indicative of abusive mobile messaging (e.g., that the mobile message and associated mobile message sender may be abusive). At this point, methodology 800 can proceed to reference point C, wherein, as desired, methodology 900 can proceed from reference point C to perform further evaluation of each originating address for which an abuse indicator was provided.

Figure 9:
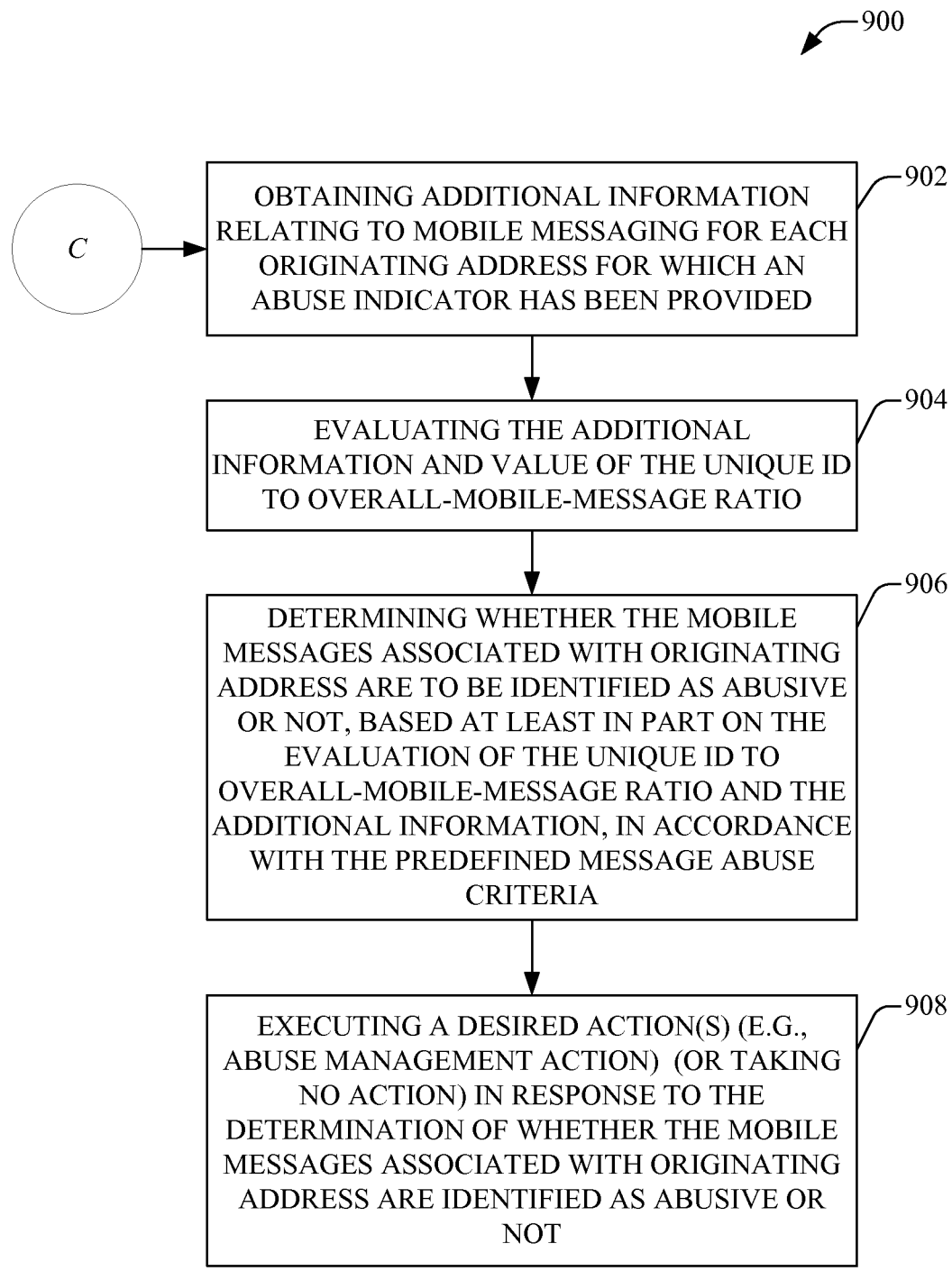
FIG. 9 illustrates a flowchart of an example methodology that can identify abusive mobile messages in accordance with still another aspect of the disclosed subject matter.

FIG. 9 presents a flowchart of an example methodology 900 that can identify abusive mobile messages in accordance with still another aspect of the disclosed subject matter. As desired, methodology 900 can proceed from reference point C of methodology 800. At 902, additional information relating to mobile messaging can be obtained for each originating address for which an abuse indicator has been provided. The additional information can comprise, for example, evaluation of historical information, CDRs, reputation of mobile message sender or recipient, abuse reports, subscriber whitelists, mobile message content (e.g., hash information related thereto), and/or honeypot reports, etc., associated with the origination address.

At 904, for each originating address associated with an abuse indicator, the additional information and value of the unique ID to overall-mobile-message ratio can be evaluated. The additional information, along with the value of the unique ID to overall-mobile-message ratio, can be evaluated to facilitate identifying whether the mobile messages associated with an originating address are abusive and the originating address and associated sender are abusive, in accordance with the predefined message abuse criteria (and corresponding predefined message abuse rules) (e.g., by applying the predefined message abuse rules to the unique ID to overall-mobile-message ratio and additional information).

At 906, for each originating address associated with an abuse indicator, it can be determined whether the mobile messages associated with originating address are to be identified or classified as abusive or not, and correspondingly it can be determined whether the originating address and associated mobile message sender are to be identified or classified as being abusive mobile message senders, based at least in part on the evaluation of the unique ID to overall-mobile-message ratio and additional information, in accordance with the predefined or learned message abuse criteria (and corresponding predefined message abuse rules).

At 908, for each originating address associated with an abuse indicator, a desired action(s) (e.g., abuse management action) can be executed (or no action is performed) in response to the determination of whether the mobile messages associated with originating address are identified or classified as abusive or not, and correspondingly whether the originating address and associated mobile message sender are identified or classified as being abusive mobile message senders, in accordance with the predefined or learned message abuse criteria (and corresponding predefined message abuse rules).

Figure 10A:
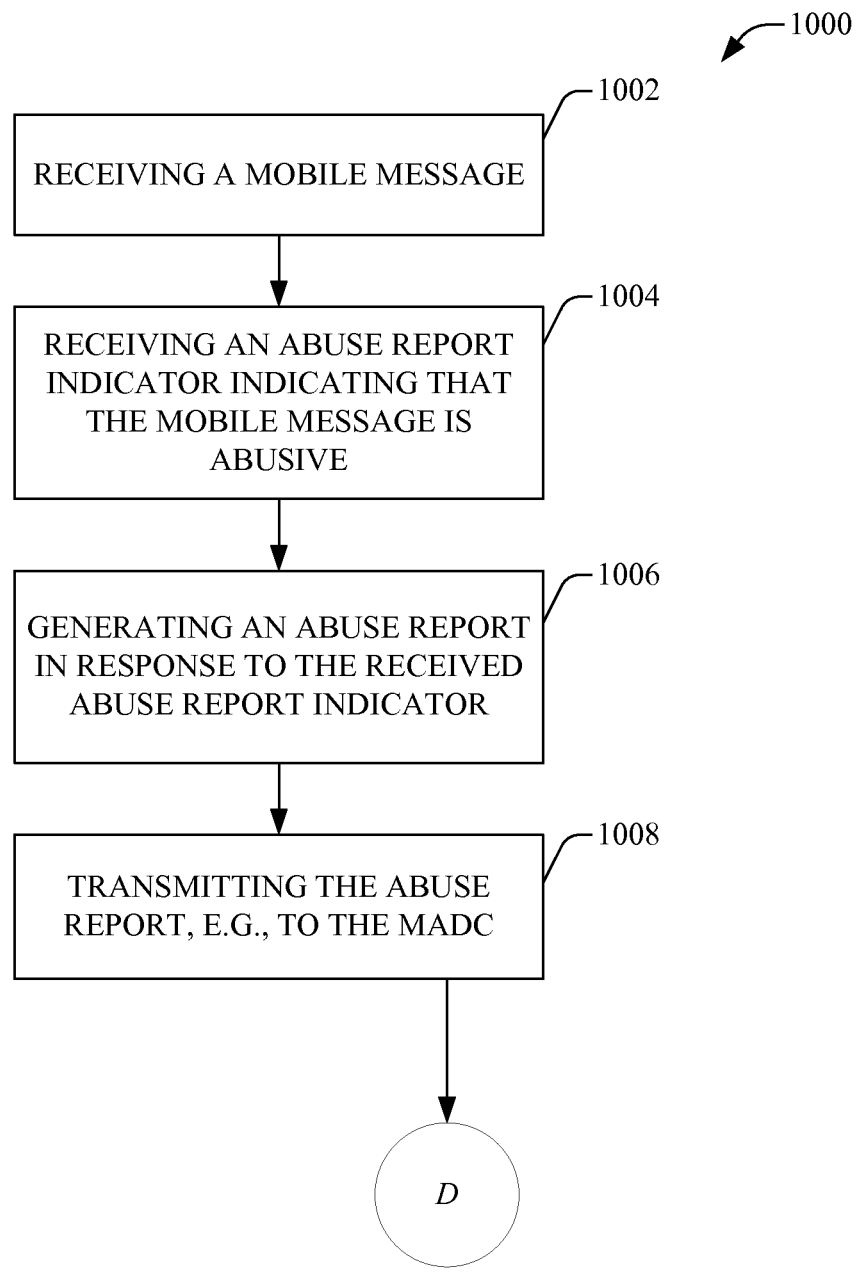
FIG. 10A depicts a flowchart of an example methodology for reporting abusive, or suspected abusive, mobile messages in accordance with an aspect of the disclosed subject matter.

FIG. 10A depicts a flowchart of an example methodology 1000 for reporting abusive, or suspected abusive, mobile messages in accordance with an aspect of the disclosed subject matter. At 1002, a mobile message can be received, for example, by a UE. In an aspect, a mobile message can be received by the UE from a sending UE associated with an originating address. At 1004, an abuse report indicator can be received, wherein the abuse report indicator can indicate that the mobile message is abusive (at least as defined by the UE user) and an abuse report is desired. For instance, the UE can present the mobile message to the user, and, if desired, can present an interface that can provide the UE user a control, button, or menu that can be used to indicate that the mobile message is abusive, via selection of the abuse report indicator, when the UE user determines the mobile message to be abusive (e.g., and abusive message button can be provided to the user, which the user can press or select to indicate that the mobile message is considered abusive by the user). In an embodiment, as desired, additional information can be received from the user to include in the abuse report, wherein the interface can provide a region for the user to enter the additional information and/or a menu with predefined information or reasons for indicating the message is abusive can be provided to the user for selection by the user to be included in the abuse report.

At 1006, an abuse report can be initiated and/or generated in response to the received abuse report indicator. In an aspect, the mobile device can initiate or generate an abuse report in response to the abuse report indicator. At 1008, the abuse report can be transmitted, for example, to the MADC for further processing. At this point, methodology 1000 can proceed to reference point D, wherein, as desired, methodology 1020 can proceed from reference point D to process an abuse report.

Figure 10B:
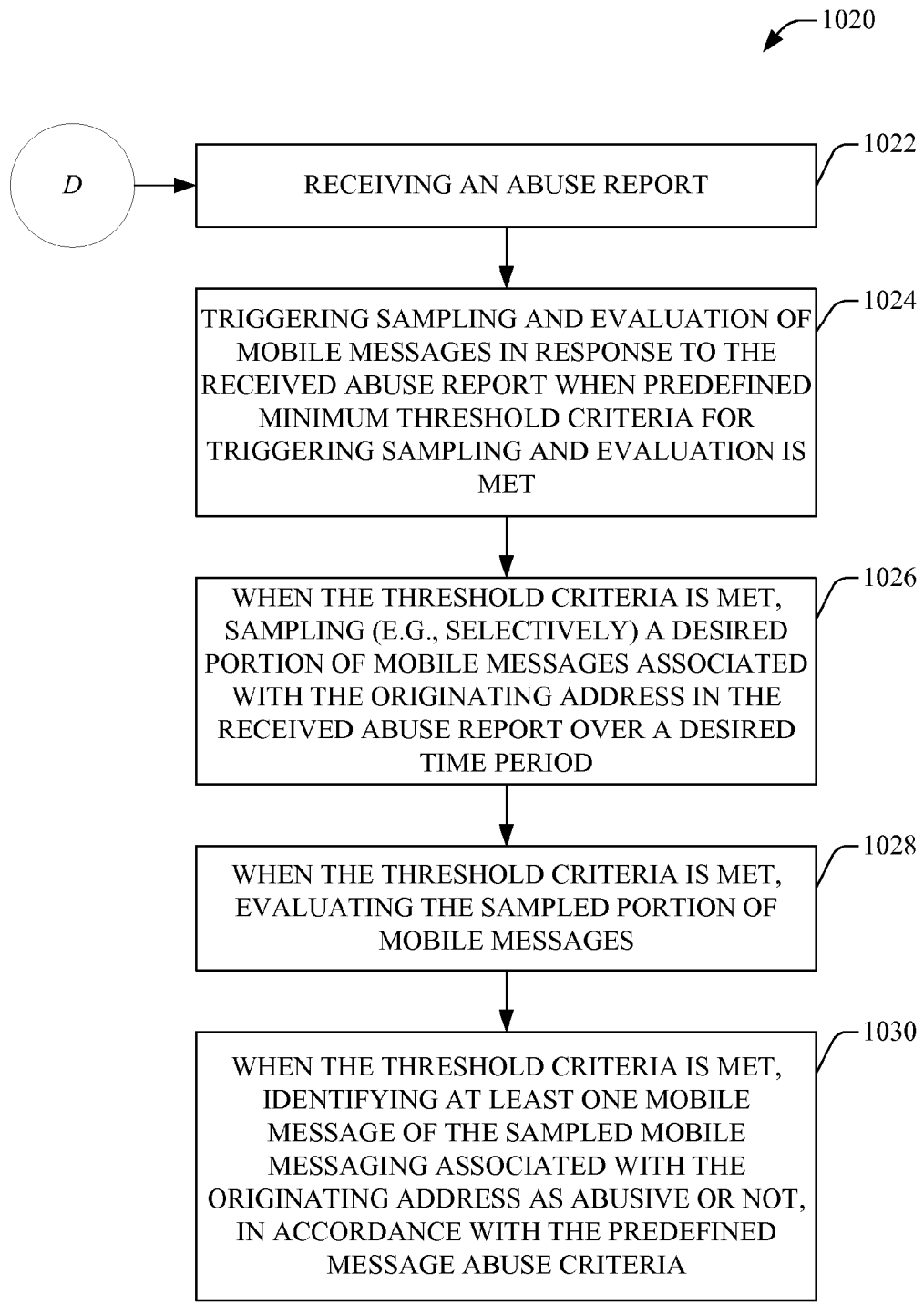
FIG. 10B illustrates a flowchart of an example methodology for processing abuse reports in accordance with an aspect of the disclosed subject matter.

FIG. 10B presents a flowchart of an example methodology 1020 for processing abuse reports in accordance with an aspect of the disclosed subject matter. As desired, methodology 1020 can proceed from reference point D. At 1022, an abuse report relating to mobile messaging can be received, for example, by the MADC from a UE. In an aspect, the abuse report can relate to a mobile message(s) from a sending UE associated with an originating address to the UE. At 1024, sampling and evaluation of mobile messages can be triggered in response to the received abuse report when predefined minimum threshold criteria for triggering sampling and evaluation are met. The predefined minimum threshold criteria for triggering sampling and evaluation can be a predefined or learned minimum threshold number of abuse reports, a predefined threshold volume of sent messages, based at least in part on the mobile message sender's reputation or history, or a combination of these criteria. One example is a policy wherein the triggering can occur for each received abuse report. If the predefined minimum threshold criteria for triggering sampling and evaluation are not met, the abuse report can be stored, and/or the count of abuse reports associated with the originating address can be incremented, and the count and type of abuse reports can be stored.

At 1026, when the predefined minimum threshold criteria for triggering sampling and evaluation are met, a desired portion of mobile messages associated with the originating address in the received abuse report can be sampled (e.g., selectively sampled) over a desired time period, based at least in part on the predefined message abuse criteria. As desired, additional information (e.g., historical information, CDRs, reputation, honeypot reports, and/or mobile message content, etc., associated with the originating address) can be obtained as well. Further, when desired, the reputation or other information relating to the termination address can be obtained, for example, to facilitate determining whether the abuse report was generated for malicious reasons.

At 1028, when the predefined minimum threshold criteria for triggering sampling and evaluation are met, the sampled portion of mobile messages can be evaluated. For example, the MADC can identify whether the sampled mobile messaging associated with the originating address qualifies the originating address as a high-count mobile message sender; and, if so, can calculate the unique ID to overall-mobile-message ratio for the sampled mobile messages to identify whether the mobile messages associated with the originating address are abusive or not, such as more fully described herein, and/or can perform additional evaluation of the additional information to facilitate identifying whether the mobile messages associated with the originating address are abusive or not.

At 1030, when the predefined minimum threshold criteria for triggering sampling and evaluation are met, at least one message of the sampled mobile messaging associated with the originating address can be identified or classified as abusive or not (and corresponding the originating address and associated mobile message sender can be identified as an abuser or not), based at least in part on the evaluation, in accordance with message abuse criteria.

Figure 11:
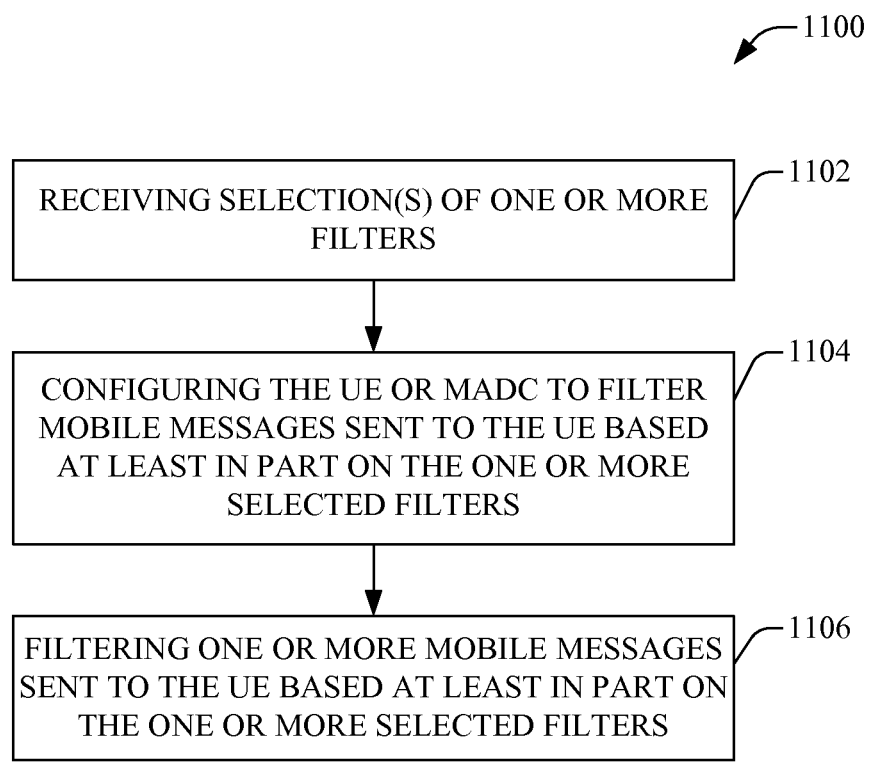
FIG. 11 depicts a flowchart of an example methodology that can facilitate filtering of mobile messages in accordance with an aspect of the disclosed subject matter.

FIG. 11 presents a flowchart of an example methodology 1100 that can facilitate filtering of mobile messages in accordance with an aspect of the disclosed subject matter. At 1102, selection(s) of one or more filters can be received. For instance, selection of one or more filters for mobile messages can be received by the UE or another communication device, such as a personal computer that is accessing a filter menu on a web site of the wireless service provider providing wireless service to the UE. Each of the filters can employ one or more filter rules, hashes, and/or other configuration information to facilitate filtering mobile messages, and can apply and/or enforce one or more filter rules corresponding to the filter to filter mobile messages in accordance with the predefined message abuse criteria.

At 1104, the UE or MADC can be configured to filter mobile messages sent to the UE based at least in part on the one or more selected filters. When the filters are local filters (e.g., filters that can be applied or enforced locally on the UE), the UE can be configured to apply such selected filters to mobile messages sent to the UE; and when the filters are filters implemented at the network level, the MADC can be configured to apply such selected mobile filters to mobile messages sent to the UE.

At 1106, one or more mobile messages sent to the UE can be filtered based at least in part on the one or more selected filters. In an aspect, the MADC and/or UE can apply the selected filters to mobile messages sent to the UE to filter the mobile messages in accordance with the selected filters. It is to be appreciated and understood that the wireless service provider can desire to apply other filters and/or limiters to mobile messages sent to the UE or other UEs communicating in the core network, and such other filters can be applied to filter mobile messages sent to the UE or other UEs, in accordance with the predefined or learned message abuse criteria.

Figure 12:
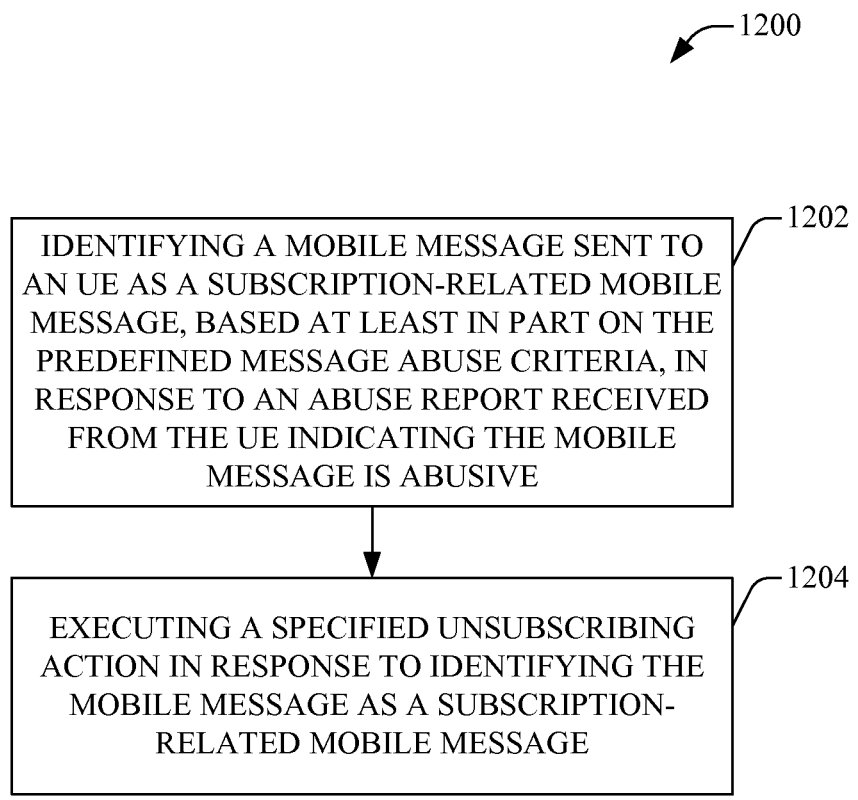
FIG. 12 illustrates a flowchart of an example methodology that can facilitate unsubscribing a subscription in accordance with an aspect of the disclosed subject matter.

FIG. 12 illustrates a flowchart of an example methodology 1200 that can facilitate unsubscribing a subscription in accordance with an aspect of the disclosed subject matter. At 1202, a mobile message sent to a UE can be identified or classified as a subscription-related mobile message, based at least in part on the predefined message abuse criteria, in response to an abuse report received from the UE indicating the mobile message is abusive.

At 1204, a specified unsubscribing action can be executed (e.g., automatically executed) in response to identifying or classifying the mobile message as a subscription-related mobile message. In an aspect, the unsubscribing action can comprise, for example, recommending to the subscription service provider that the subscription of the UE user (e.g., subscriber to the subscription service) be canceled or discontinued, on behalf of the subscriber; notifying the UE user that the mobile message was subscription related and recommending that the UE user contact the subscription service provider to cancel the subscription to the service if the UE user does not desire further mobile messages or service from the subscription provider; and/or acting on behalf of the user, via spoofing the UE user's mobile address, to send a message to the subscription service provider to cancel or discontinue the subscription service for the UE user.

Figure 13A:
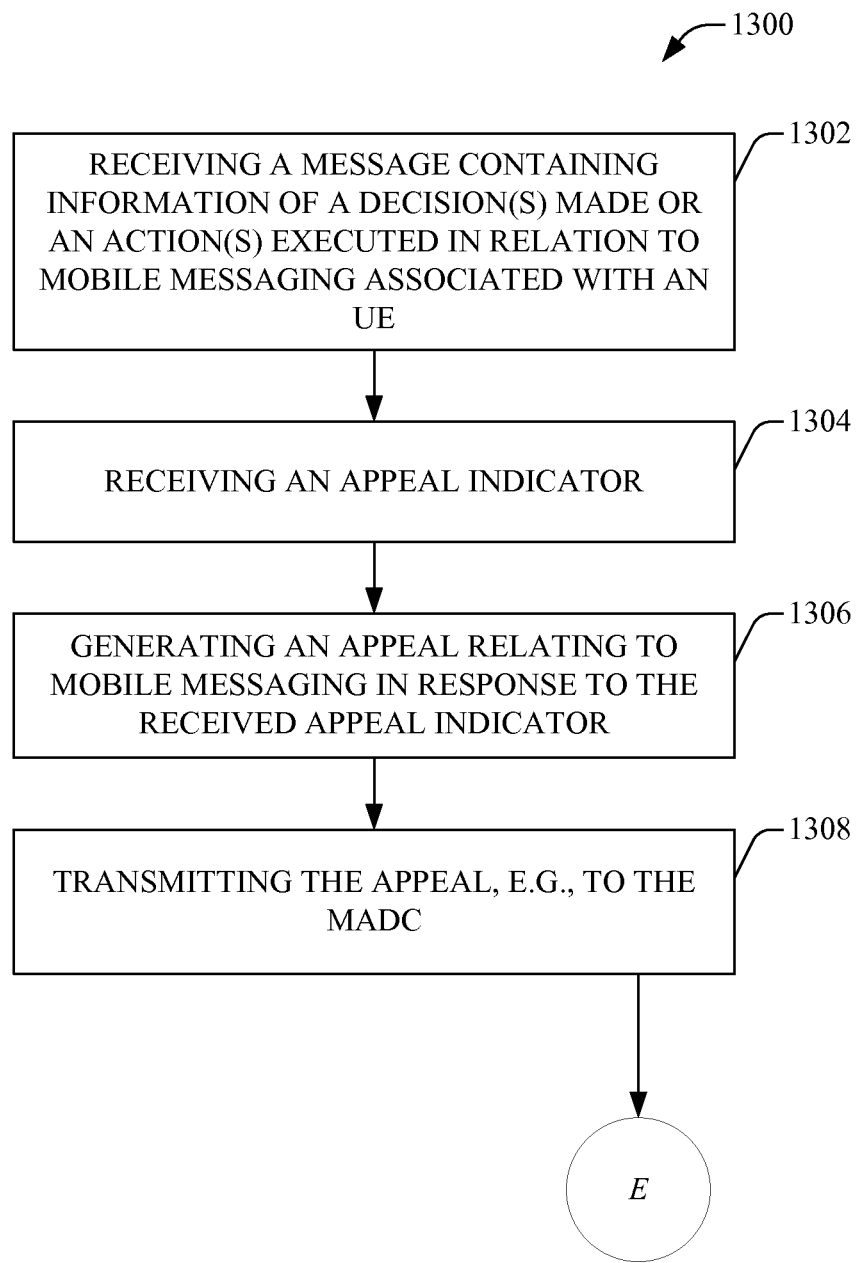
FIG. 13A depicts a flowchart of an example methodology for generating an appeal relating to mobile messaging in accordance with an aspect of the disclosed subject matter.

FIG. 13A illustrates a flowchart of an example methodology 1300 for generating an appeal relating to mobile messaging in accordance with an aspect of the disclosed subject matter. At 1302, a message (e.g., mobile message, email) containing information of a decision(s) made or an action(s) executed in relation to mobile messaging associated with a UE can be received. For example, the decision(s) made or action(s) executed can be related to mobile messaging, and can further relate to a suspension or blocking of mobile messaging associated with an originating address associated with a UE, or a denial of credit for mobile messaging received by a UE associated with a termination address when such UE user believed the mobile messaging to be abusive.

At 1304, an appeal indicator can be received. The UE or another communication device (e.g., personal computer) can receive an appeal indicator from the UE user, for example, via selection of an appeal control or button, which can be selected or manipulated to initiate an appeal of the decision(s) or action(s). At 1306, an appeal relating to mobile messaging can be generated in response to the received appeal indicator. In accordance with various aspects, the appeal can be initiated or generated at the UE or via the web site of the wireless service provider in response to the received appeal indicator. As desired, additional information (e.g., contextual information) relating to the appeal can be received from the UE user and included in the appeal.

At 1308, the appeal can be transmitted, for example, to the MADC from the UE or another communication device, for further processing of the appeal. At this point, the methodology 1300 can proceed to reference point E, wherein, as desired, methodology 1320, as depicted in FIG. 13B, can proceed to processing (e.g., automatically processing) the appeal.

Figure 13B:
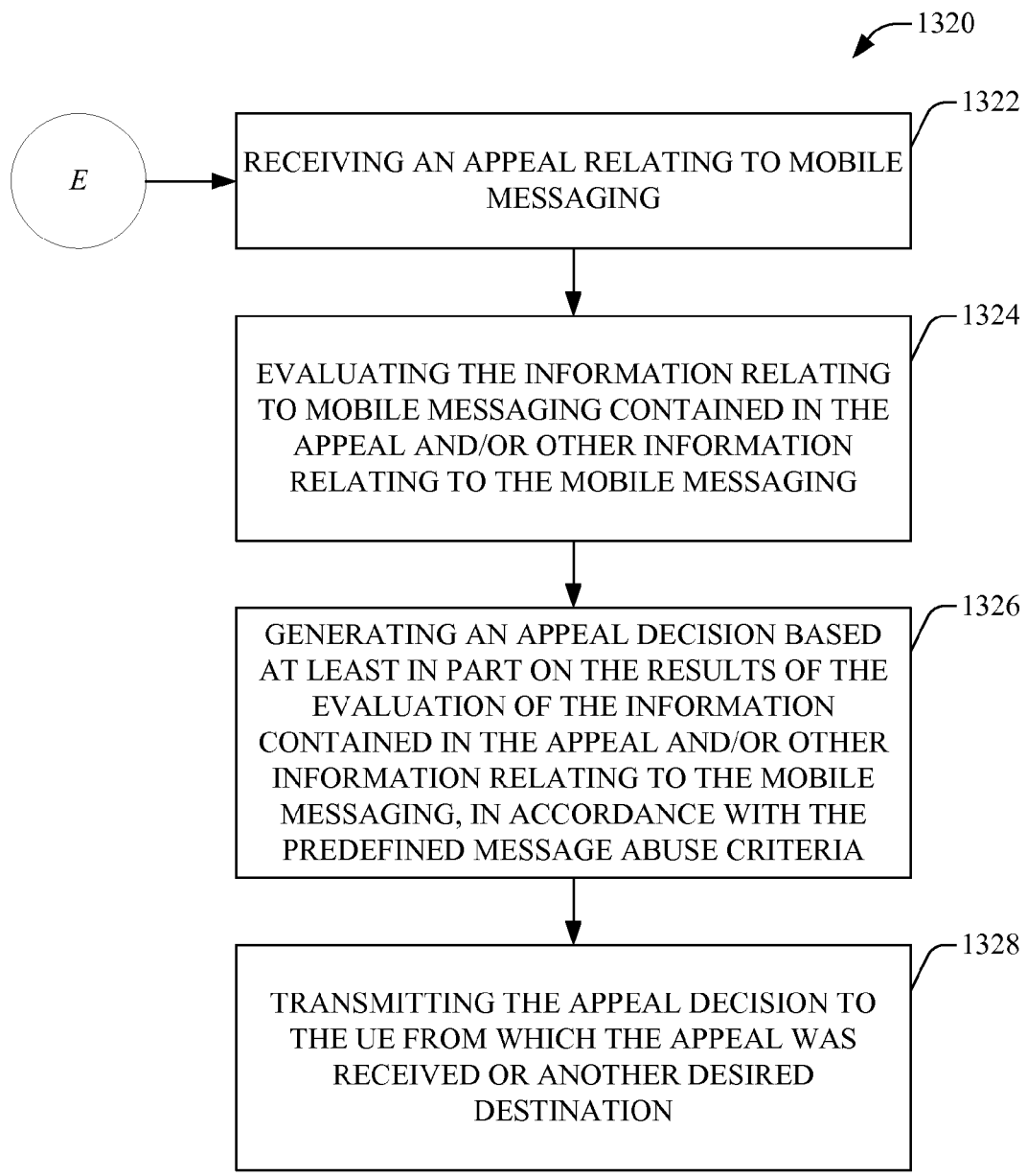
FIG. 13B illustrates a flowchart of an example methodology for automated processing of an appeal relating to mobile messaging in accordance with an aspect of the disclosed subject matter.

FIG. 13B depicts a flowchart of an example methodology 1320 for automated processing of an appeal relating to mobile messaging in accordance with an aspect of the disclosed subject matter. As desired, the methodology 1320 can proceed from reference point E. At 1322, an appeal relating to mobile messaging can be received, for example, by the MADC.

At 1324, the information relating to mobile messaging contained in the appeal and/or other information relating to the mobile messaging and/or appeal (e.g., historical information, CDRs, reputation, honeypot reports, and/or mobile message content, etc., associated with the originating address or address of the UE when not the originating address), can be evaluated (e.g., automatically perform an in-depth evaluation beyond the initial evaluation that resulted in the decision(s) or action(s) that is the subject of the appeal), in accordance with the predefined message abuse criteria.

At 1326, an appeal decision can be generated (e.g., automatically generated) based at least in part on the results of the evaluation of the information contained in the appeal and/or other information relating to the mobile messaging and/or appeal, in accordance with the predefined message abuse criteria. In an aspect, the MADC can automatically generate an appeal decision affirming the initial decision(s) made or action(s) taken or indicating a new decision(s) made or action(s) to be taken in response to the appeal. At 1328, the appeal decision can be transmitted to the UE from which the appeal was received or another desired destination (e.g., email address) associated with the UE user who made the appeal. In an aspect, if the appeal decision results in a new decision(s) or action(s) to be taken, as desired, the MADC can proceed to automatically perform the new action(s) (e.g., credit the account of the UE user for abusive mobile messaging received by the UE, credit the account for abusive mobile messaging sent by the UE due to the UE being infected with malware through no fault of the UE user, unblocking mobile messaging for a UE associated with an originating address, etc.).

It is to be appreciated and understood that components (e.g., UE, AP, core network, MADC, etc.), as described with regard to a particular system or methodology, can include the same or similar functionality as respective components (e.g., respectively named components or similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store instructions; and
a processor, coupled to the memory, that facilitates execution of the instructions to perform operations, comprising:
 facilitating communication of mobile messages between mobile communication devices via a set of network devices of a communication network;
 sampling a portion of the mobile messages over a defined period of time;
 determining a mobile message of the portion of the mobile messages to be a subscription-related mobile message and not an abusive mobile message based on evaluation of respective originating addresses and respective termination addresses of respective mobile messages in the portion of the mobile messages, in accordance with a defined message abuse criterion that indicates whether the mobile message qualifies as being abusive; and
 initiating an abuse management action to facilitate discontinuation of a subscription associated with the subscription-related mobile message and a subscriber identity associated with a termination address of the mobile message in response to determining the mobile message to be the subscription-related mobile message and not the abusive mobile message, wherein the initiating of the abuse management action comprises initiating a transmission of a cancellation message via a transmitter to a subscription provider device of a subscription service provider associated with the mobile message to cancel the subscription on behalf of the subscriber identity.

2. The system of claim 1, wherein the operations further comprise counting a number of mobile messages in the portion of the mobile messages that are associated with an originating address of the respective originating addresses, and determining the originating address to be a high-count mobile message sender in response to identification of the number of mobile messages associated with the originating address being at least a defined high-count threshold number of mobile messages applicable for the defined period of time.

3. The system of claim 2, wherein the operations further comprise, for the originating address, counting a number of unique termination addresses identified in a subset of mobile messages associated with the originating address and in the portion of the mobile messages, and calculating a ratio of the number of unique termination addresses to the number of mobile messages associated with the originating address.

4. The system of claim 3, wherein the subset of mobile messages comprises an other mobile message, and the operations further comprise: in response to identification of the ratio being at least a defined threshold ratio level indicative of mobile message abuse, determining the originating address to be an abusive mobile message sender and identifying the other mobile message from the originating address to be the abusive mobile message, in accordance with the defined message abuse criterion.

5. The system of claim 3, wherein the subset of mobile messages comprises an other mobile message, and the operations further comprise performing an evaluation to facilitate determining whether the originating address is an abusive mobile message sender and whether the other mobile message from the originating address is the abusive mobile message, wherein the evaluation comprises evaluation of the ratio and historical information associated with the originating address, in accordance with the defined message abuse criterion.

6. The system of claim 1, wherein the operations further comprise:
identifying a number of abuse reports associated with an originating address that have been received; and
sampling the portion of the mobile messages in response to a defined threshold number of abuse reports associated with the originating address being received.

7. The system of claim 1, wherein another mobile message in the portion of messages is associated with an originating address, and the operations further comprise:
determining the other mobile message to be an abusive mobile message and the originating address to be an abusive mobile message sender; and
initiating another abuse management action that comprises shutdown of service of a mobile communication device associated with the originating address associated with the abusive mobile message.

8. The system of claim 1, wherein another mobile message in the portion of messages is associated with an originating address, and the operations further comprise:
determining the other mobile message to be an abusive mobile message and the originating address to be an abusive mobile message sender; and
initiating another abuse management action that comprises blockage of mobile messages from the originating address associated with the abusive mobile message.

9. The system of claim 1, wherein the operations further comprise filtering an identified mobile message having a specified termination address associated with a mobile communication device to prevent delivery of the identified mobile message to the mobile communication device based on a filter selected to be applied to mobile messages sent to the specified termination address.

10. The system of claim 1, wherein the operations further comprise hashing the mobile message of the portion of the mobile messages and generating hash information that is representative of content of the mobile message, to facilitate determining whether the mobile message is an abusive mobile message.

11. The system of claim 1, wherein the operations further comprise:
receiving an abuse report from a mobile communication device, wherein the abuse report comprises information that indicates the mobile message received by the mobile communication device is an abusive mobile message; and
initiating a response action in response to the receiving.

12. The system of claim 1, wherein the mobile message a text message.

13. A method, comprising:
evaluating, by a system comprising a processor, respective address information respectively associated with mobile messages in a subset of mobile messages selected, over a defined period of time, from a mobile message stream communicated via a network device of a communication network;
identifying, by the system, a mobile message of the subset of mobile messages as a subscription-related mobile message and not an abusive mobile message based on a result of the evaluating of the respective address information and a defined message abuse criterion that indicates whether the mobile message qualifies as being abusive; and
executing, by the system, a specified unsubscribing action in response to identifying the mobile message as the subscription-related mobile message and not the abusive mobile message, wherein the executing of the specified unsubscribing action comprises transmitting a cancellation message to a subscription provider device of a subscription service provider associated with the mobile message to cancel a subscription of a subscriber identity associated with a termination address of the mobile message on behalf of the subscriber identity.

14. The method of claim 13, further comprising:
for an originating address associated with at least some of the mobile messages in the subset of mobile messages,
counting, by the system, a number of mobile messages associated with the originating address;
comparing, by the system, the number of mobile messages to a defined high-count threshold number of mobile messages applicable for the defined period of time; and
identifying, by the system, the originating address as being a high-count mobile message sender in response to determining that the number of mobile messages satisfies the defined high-count threshold number of mobile messages.

15. The method of claim 14, further comprising:
for the originating address identified as being the high-count mobile message sender,
counting, by the system, a number of unique termination addresses for the originating address;
computing, by the system, a ratio of the number of unique termination addresses to the number of mobile messages associated with the originating address; and
identifying, by the system, the originating address as being associated with an abusive mobile message sender that sent an abusive mobile message in response to determining that the ratio satisfies a defined threshold ratio level indicative of abusive mobile messaging in accordance with the defined message abuse criterion.

16. The method of claim 14, further comprising:
for the originating address identified as being the high-count mobile message sender,
generating, by the system, an abuse indicator in response to determining that a ratio of the number of unique termination addresses to the number of mobile messages associated with the originating address has a value that satisfies a defined threshold ratio level indicative of abusive mobile messaging, in accordance with the defined message abuse criterion;
obtaining, by the system, additional information relating to mobile messaging associated with the originating address, the additional information comprising historical information associated with the originating address;
evaluating, by the system, the ratio and the additional information; and
identifying, by the system, a specified mobile message associated with the originating address as an abusive mobile message, based on the evaluating of the ratio and the additional information indicating the specified mobile message is abusive, in accordance with the defined message abuse criterion.

17. The method of claim 13, further comprising:
receiving, by the system, an abuse report from a wireless communication device, wherein the abuse report comprises information indicating a reason that the mobile message associated with an originating address is determined to be abusive by a subscriber identity associated with the wireless communication device;

performing, by the system, evaluation of the abuse report in response to the receiving of the abuse report;

determining, by the system, whether a defined minimum threshold criterion for triggering evaluation of mobile messaging associated with the originating address is satisfied based on the evaluation of the abuse report; and in response to the defined minimum threshold criterion for triggering evaluation being satisfied, evaluating, by the system, mobile messages associated with the originating address to facilitate identifying whether the mobile message is an abusive mobile message.

18. The method of claim 13, further comprising:

hashing, by the system, the mobile message; and generating, by the system, hash information that is representative of content of the mobile message to facilitate determining whether the mobile message is abusive.

19. A non-transitory computer-readable storage medium storing computer-executable instructions that, in response to execution, cause a system comprising a processor to perform operations, comprising:

evaluating address information respectively associated with mobile messages in a subset of mobile messages selected, over a defined period of time, from a mobile message stream communicated via a network device of a mobile communication network;

identifying a mobile message of the subset of mobile messages as a subscription-related mobile message and not an abusive mobile message based on a result of the evaluating of the address information and a defined message abuse criterion that indicates whether the mobile message qualifies as being abusive; and executing a specified unsubscribing action in response to identifying the mobile message as the subscription-related mobile message and not the abusive mobile message, wherein the executing of the specified unsubscribing action comprises transmitting a cancellation message, on behalf of a subscriber identity associated with a termination address of the mobile message, to a subscription provider device of a subscription service provider that initiated the mobile message to cancel a subscription of the subscriber identity with the subscription service provider.

20. The computer-readable storage device of claim 19, wherein the operations further comprise:

hashing the mobile message;

generating hash information that is representative of content of the mobile message to facilitate determining whether the mobile message is abusive; and determining whether the mobile message is abusive based on an evaluation of the hash information.

* * * * *